(12) United States Patent
Divliansky et al.

(10) Patent No.: US 12,710,578 B2
(45) Date of Patent: Aug. 18, 2026

(54) OPTICAL ISOLATOR BASED ON VOLUME BRAGG GRATINGS

(71) Applicant: University of Central Florida Research Foundation, Inc., Orlando, FL (US)

(72) Inventors: Ivan Divliansky, Orlando, FL (US); Oussama Mhibik, Oviedo, FL (US); Axel Schülzgen, Orlando, FL (US)

(73) Assignee: University of Central Florida Foundation, Inc., Orlando, FL (US)

( * ) Notice: Subject to any disclaimer, the term of this patent is extended or adjusted under 35 U.S.C. 154(b) by 251 days.

(21) Appl. No.: 18/532,380

(22) Filed: Dec. 7, 2023

(65) Prior Publication Data

US 2024/0192420 A1 Jun. 13, 2024

Related U.S. Application Data

(60) Provisional application No. 63/430,805, filed on Dec. 7, 2022.

(51) Int. Cl.

*G02B 5/18* (2006.01)
*G01J 4/04* (2006.01)
*G02B 5/32* (2006.01)

(52) U.S. Cl.

CPC .................. *G02B 5/32* (2013.01); *G01J 4/04* (2013.01); *G02B 5/1814* (2013.01)

(58) Field of Classification Search

None
See application file for complete search history.

(56) References Cited

U.S. PATENT DOCUMENTS 6,181,427 B1 1/2001 Yarussi et al.
2005/0105084 A1 5/2005 Wang et al.
(Continued)

FOREIGN PATENT DOCUMENTS

CN 108459367 A 8/2018

OTHER PUBLICATIONS

Bandyopadhyay et al., "Highly efficient free-space fiber coupler with 45 tilted fiber grating to access remotely placed optical fiber sensors," Optics Express, vol. 28, No. 11, May 25, 2020, 10 pages.
(Continued)

*Primary Examiner* — Derek S. Chapel
(74) *Attorney, Agent, or Firm* — Suiter Swantz IP

(57) ABSTRACT

An optical isolator may include one or more rotated volume Bragg gratings (r-VBGs) within a volume of a material having an input face, where each of the r-VBGs reflects along a reflection path portions of input light propagating along an incidence vector through the input face that satisfies a Bragg condition for one or more selected wavelengths and has a polarization orthogonal to a diffraction plane formed by the associated grating vector and the incidence vector, and where each of the r-VBGs transmits remaining portions of the input light as transmitted light along a transmission path. The isolator may also include one or more polarization-controlling optics located along the transmission path configured to modify a polarization of return light propagating back along the transmission path towards the one or more r-VBGs, where the one or more r-VBGs reflect portions of the return light that satisfy the Bragg condition.

8 Claims, 25 Drawing Sheets

(56) References Cited

U.S. PATENT DOCUMENTS

| | | | | |
|---|---|---|---|---|
| 2006/0221449 | A1 | 10/2006 | Glebov et al. | |
| 2007/0153862 | A1 | 7/2007 | Shchegrov et al. | |
| 2011/0206070 | A1 | 8/2011 | Karavitis | |
| 2014/0268314 | A1 | 9/2014 | Dueck | |
| 2014/0348200 | A1 | 11/2014 | Arumugam et al. | |
| 2015/0378080 | A1 | 12/2015 | Georgiou et al. | |
| 2016/0033698 | A1 * | 2/2016 | Escuti | G02F 1/1334 349/194 |
| 2016/0116656 | A1 | 4/2016 | Glebov et al. | |
| 2017/0131546 | A1 | 5/2017 | Woltman et al. | |
| 2017/0131551 | A1 | 5/2017 | Robbins et al. | |
| 2020/0371387 | A1 | 11/2020 | Gollier et al. | |
| 2020/0387043 | A1 | 12/2020 | Blanche | |
| 2021/0354129 | A1 | 11/2021 | Meng et al. | |
| 2021/0367391 | A1 | 11/2021 | Bernier et al. | |
| 2022/0034791 | A1 | 2/2022 | Zhang | |
| 2022/0137411 | A1 | 5/2022 | Lam et al. | |
| 2022/0283376 | A1 | 9/2022 | Waldern et al. | |
| 2022/0283540 | A1 | 9/2022 | Trepanier et al. | |
| 2022/0299868 | A1 | 9/2022 | Lane et al. | |
| 2022/0365482 | A1 | 11/2022 | Yu et al. | |

OTHER PUBLICATIONS

Bharathan et al., "In-fiber polarizer based on a 45-degree tilted fluoride fiber Bragg grating for mid-infrared fiber laser technology," OSA Continuum vol. 1, No. 1, Sep. 15, 2018, 8 pages.

Ciapurin et al., "Modeling of phase volume diffractive gratings, part 1: transmitting sinusoidal uniform gratings," Optical Engineering 45, 015802, Jan. 2006, 10 pages.

Ciapurin et al., "Modeling of phase volume diffractive gratings, part 2: reflecting sinusoidal uniform gratings, Bragg mirrors," Optical Engineering 51, 058001, May 2012, 11 pages.

International Search Report and Written Opinion received in International Application No. PCT/US2023/082985, Mar. 7, 2024, 9 pages.

International Search Report and Written Opinion received in International Application No. PCT/US2023/082987, Mar. 19, 2024, 10 pages.

International Search Report and Written Opinion received in International Application No. PCT/US2023/082995, Mar. 13, 2024, 8 pages.

International Search Report and Written Opinion received in International Application No. PCT/US2023/082997, May 2, 2024, 7 pages.

Glebov, A.L., Mokhun, O., Rapaport, A., Vergnole, S., Smirnov, V. and Glebov, L.B., May 2012, Volume Bragg gratings as ultra-narrow and multiband optical filters. In Micro-Optics 2012 (vol. 8428, pp. 42-52). SPIE. (Year: 2012).

Mhibik et al., "Compact dual-band spectral analysis via multiplexed rotated chirped volume Bragg gratings," Optics Letters, The College of Optics & Photonics, University of Central Florida, Sep. 5, 2023, 5 pages.

Mhibik et al., "Rotated chirped volume Bragg gratings for compact spectral analysis," Optics Letters, vol. 48, No. 5, The College of Optics and Photonics, University of Central Florida, Mar. 1, 2023, 4 pages.

Yessenov et al., "Ultra-compact synthesis of space-time wave packets," Optics Letters, vol. 48, No. 10, The College of Optics & Photonics, University of Central Florida, Department of Electrical and Computer Engineering, University of Utah, May 15, 2023, 4 pages.

* cited by examiner

OPTICAL ISOLATOR BASED ON VOLUME BRAGG GRATINGS

CROSS-REFERENCE TO RELATED APPLICATION

The present application claims the benefit under 35 U.S.C. § 119(e) of U.S. Provisional Application Ser. No. 63/430,805, filed Dec. 7, 2022, which is incorporated herein by reference in the entirety.

TECHNICAL FIELD

The present disclosure relates generally to optical isolators and, more particularly, to optical isolators incorporating rotated volume Bragg gratings.

BACKGROUND

Optical isolators are commonly used in a wide range of applications including, but not limited to, preventing return light to sensitive light sources or other optics in an optical system. A typical optical isolator may be formed from a polarizer and a quarter waveplate. However, it may be difficult or impractical to utilize existing polarizer technology for certain wavelength ranges such as, but not limited to infrared or ultraviolet wavelengths. There is therefore a need to develop systems and methods to address the above deficiencies.

SUMMARY

An optical isolator is disclosed, in accordance with one or more embodiments of the present disclosure. In embodiments, the isolate includes one or more rotated volume Bragg gratings (r-VBGs) within a volume of a material having an input face, where each of the r-VBGs is formed as planes of refractive index variation with periodicity along a grating vector at a non-zero angle relative to a normal vector of the input face, where each of the r-VBGs reflects along a reflection path portions of input light propagating along an incidence vector through the input face that satisfies a Bragg condition for one or more selected wavelengths and has a polarization orthogonal to a diffraction plane formed by the associated grating vector and the incidence vector, and where each of the r-VBGs transmits remaining portions of the input light as transmitted light along a transmission path. In embodiments, the isolator includes one or more polarization-controlling optics located along the transmission path configured to modify a polarization of return light propagating back along the transmission path towards the one or more r-VBGs, where the one or more r-VBGs reflect portions of the return light that satisfy the Bragg condition.

In embodiments, the one or more r-VBGs include a single r-VBG. In embodiments, the one or more r-VBGs include a first r-VBG, where the grating vector of the first r-VBG is oriented along a first direction; and a second r-VBG, wherein the grating vector of the second r-VBG is oriented along a second direction different than the first direction.

In embodiments, the refractive index variations of the first and second r-VBGs have equivalent distributions along the respective grating vectors, where the one or more wavelengths reflected by the first r-VBG are equal to the one or more wavelengths reflected by the second r-VBG.

In embodiments, the refractive index variations of the first and second r-VBGs have uniform periods along the respective grating vectors. In embodiments, the refractive index variations of the first and second r-VBGs are chirped along the respective grating vectors. In embodiments the r-VBG is apodized.

In embodiments, the refractive index variations of the first and second r-VBGs have different distributions along the respective grating vectors, where the one or more wavelengths reflected by the first r-VBG are different than the one or more wavelengths reflected by the second r-VBG.

In embodiments, the first direction is orthogonal to the second direction.

In embodiments, the one or more r-VBGs comprise a first r-VBG and a second r-VBG, where the grating vectors of the first and second r-VBGs are oriented along a common direction, where the refractive index variations of the first and second r-VBGs have different distributions along the respective grating vectors, and where the one or more wavelengths reflected by the first r-VBG are different than the one or more wavelengths reflected by the second r-VBG.

In embodiments, the one or more polarization-controlling optics comprise a quarter waveplate.

In embodiments, the material is a bulk material. In embodiments, the material is a polarization-maintaining fiber having one of a fast axis or a slow axis oriented along the diffraction plane. In embodiments, the one or more polarization-controlling optics comprise a segment of polarization-maintaining fiber having a fast axis oriented at 45 degrees relative to the diffraction plane, where a length of the segment is selected to provide quarter-wave retardation for one of the one or more selected wavelengths.

In embodiments the material is a photosensitive material, wherein the one or more r-VBGs are formed through a holographic recording process. In embodiments, the material comprises at least one of a glass, a crystal, a polymer, or a sol-gel.

An optical isolator is disclosed, in accordance with one or more illustrative embodiments of the present disclosure. In embodiments, the isolator includes one or more rotated volume Bragg gratings (r-VBGs) within a volume of a material having an input face, where each of the r-VBGs is formed as planes of refractive index variation with periodicity along a grating vector at a non-zero angle relative to a normal vector of the input face, where each of the r-VBGs reflects along a common reflection path portions of input light propagating along an incidence vector through the input face that satisfies a Bragg condition for one or more selected wavelengths and has a polarization orthogonal to a diffraction plane formed by the associated grating vector and the incidence vector, and where each of the r-VBGs transmits remaining portions of the input light as transmitted light along a transmission path. In embodiments, the isolator includes one or more polarization-controlling optics located along the common reflection path of the one or more r-VBGs configured to rotate a polarization of retroreflected light propagating back along the common reflection path towards the one or more r-VBGs by 90 degrees, wherein the one or more r-VBGs transmit the retroreflected light.

In embodiments, the one or more r-VBGs comprise a single r-VBG. In embodiments, the one or more r-VBGs comprise a first r-VBG and a second r-VBG, where the grating vectors of the first and second r-VBGs are oriented along a common direction, where the refractive index variations of the first and second r-VBGs have different distributions along the respective grating vectors, and where the one or more wavelengths reflected by the first r-VBG are different than the one or more wavelengths reflected by the second r-VBG.

In embodiments, the refractive index variations of the first and second r-VBGs have uniform periods along the respective grating vectors. In embodiments, the refractive index variations of the first and second r-VBGs are chirped along the respective grating vectors. In embodiments, first and second r-VBGs are apodized.

In embodiments, the one or more polarization-controlling optics comprise a quarter waveplate.

In embodiments, the material comprises at least one of a glass, a crystal, a polymer, or a sol-gel.

An optical source is disclosed, in accordance with one or more illustrative embodiments of the present disclosure. In embodiments, the source includes a light source providing input light. In embodiments, the source includes one or more rotated volume Bragg gratings (r-VBGs) within a volume of a material having an input face, where each of the r-VBGs is formed as planes of refractive index variation with periodicity along a grating vector at a non-zero angle relative to a normal vector of the input face, where each of the r-VBGs reflects portions of input light propagating along an incidence vector through the input face that satisfies a Bragg condition for one or more selected wavelengths and has a polarization orthogonal to a diffraction plane formed by the associated grating vector and the incidence vector, and where each of the r-VBGs transmits remaining portions of the input light as transmitted light along a transmission path. In embodiments, the source includes one or more polarization-controlling optics located along the transmission path configured to modify a polarization of return light propagating back along the transmission path towards the one or more r-VBGs, wherein the one or more r-VBGs reflect portions of the return light that satisfy the Bragg condition.

In embodiments, the one or more polarization-controlling optics comprise a quarter waveplate. In embodiments, the material is a bulk material. In embodiments, the material is a polarization-maintaining fiber having one of a fast axis or a slow axis oriented along the diffraction plane.

In embodiments, the one or more polarization-controlling optics comprise a segment of polarization-maintaining fiber having a fast axis oriented at 45 degrees relative to the diffraction plane, where a length of the segment is selected to provide quarter-wave retardation for one of the one or more selected wavelengths.

In embodiments, the one or more r-VBGs comprise a first r-VBG, wherein the grating vector of the first r-VBG is oriented along a first direction and a second r-VBG, wherein the grating vector of the second r-VBG is oriented along a second direction different than the first direction.

In embodiments, the refractive index variations of the first and second r-VBGs have equivalent distributions along the respective grating vectors, wherein the one or more wavelengths reflected by the first r-VBG are equal to the one or more wavelengths reflected by the second r-VBG. In embodiments, the refractive index variations of the first and second r-VBGs have uniform periods along the respective grating vectors. In embodiments, the refractive index variations of the first and second r-VBGs are chirped along the respective grating vectors. In embodiments, the refractive index variations of the first and second r-VBGs have different distributions along the respective grating vectors, wherein the one or more wavelengths reflected by the first r-VBG are different than the one or more wavelengths reflected by the second r-VBG.

In embodiments, the refractive index variations of the first and second r-VBGs have uniform periods along the respective grating vectors. In embodiments, the refractive index variations of the first and second r-VBGs are chirped along the respective grating vectors.

In embodiments, the one or more r-VBGs comprise a first r-VBG and a second r-VBG, where the grating vectors of the first and second r-VBGs are oriented along a common direction, wherein the refractive index variations of the first and second r-VBGs have different distributions along the respective grating vectors, and where the one or more wavelengths reflected by the first r-VBG are different than the one or more wavelengths reflected by the second r-VBG.

In embodiments, the refractive index variations of the first r-VBG has a first uniform period along the corresponding grating vector, wherein the refractive index variations of the second r-VBG has a second uniform period along the corresponding grating vector.

In embodiments, the refractive index variations of the first and second r-VBGs are chirped with different distributions along the respective grating vectors.

In embodiments, the input light from the light source includes wavelengths within two or more spectral regions.

In embodiments, the one or more r-VBGs comprise a single r-VBG, wherein a period of the single r-VBG along the grating vector is chirped to vary monotonically along the grating vector to provide that the Bragg condition is satisfied for different wavelengths at different locations of the single r-VBG along the incidence vector. In embodiments, portions of the input light associated with the two or more spectral regions are reflected by the single r-VBG at different locations along the incidence vector as two or more spatially-separated output beams.

In embodiments, the one or more r-VBGs comprise a first r-VBG, wherein the grating vector of the first r-VBG is oriented along a first direction and a second r-VBG, where the grating vector of the second r-VBG is oriented along a second direction different than the first direction, wherein the refractive index variations of the first and second r-VBGs have different distributions along the respective grating vectors, where portions of the input light associated with at least one of the two or more spectral regions are reflected by the first r-VBG, and where portions of the input light associated with at least one of the two or more spectral regions are reflected by the second r-VBG.

In embodiments, the refractive index variations of the first and second r-VBGs have uniform periods along the respective grating vectors. In embodiments, the refractive index variations of the first and second r-VBGs are chirped along the respective grating vectors.

In embodiments, the first direction is orthogonal to the second direction.

In embodiments, the one or more r-VBGs comprise a first r-VBG and a second r-VBG, where the grating vectors of the first and second r-VBGs are oriented along a common direction, where the refractive index variations of the first and second r-VBGs have different distributions along the respective grating vectors, wherein portions of the input light associated with at least one of the two or more spectral regions are reflected by the first r-VBG, and where portions of the input light associated with at least one of the two or more spectral regions are reflected by the second r-VBG.

In embodiments, the refractive index variations of the first r-VBG has a first uniform period along the corresponding grating vector, wherein the refractive index variations of the second r-VBG has a second uniform period along the corresponding grating vector.

In embodiments, the refractive index variations of the first and second r-VBGs are chirped with different distributions along the respective grating vectors.

A polarization analyzer is disclosed in accordance with one or more illustrative embodiments of the present disclosure. In embodiments, the polarization analyzer includes a rotated volume Bragg grating (r-VBG) polarizer comprising one or more r-VBGs within a volume of a material having an input face, where each of the r-VBGs is formed as planes of refractive index variation with periodicity along a grating vector at a non-zero angle relative to a normal vector of the input face, where each of the r-VBGs reflects portions of input light along a reflection path propagating along an incidence vector through the input face that satisfies a Bragg condition for one or more selected wavelengths and has a polarization orthogonal to a diffraction plane formed by the associated grating vector and the incidence vector, and where each of the r-VBGs transmits remaining portions of the input light. In embodiments, the polarization analyzer includes a first detector along the transmission path and one or more second detectors along the reflection paths of the one or more r-vBGs, wherein relative powers of light captured by the first detector and the one or more second detectors is indicative of a polarization state of the input light.

In embodiments, the polarization analyzer further includes a controller communicatively coupled to the first detector and the second detector, where the controller is configured to receive a first detection signal from the first detector indicative of a portion of the input light along the first path, receive one or more second detection signals from the one or more second detectors indicative of a portion of the input light along the reflection paths of the one or more r-VBGs, and determine a polarization state of the input light based on the first detection signal and the one or more second detection signals.

In embodiments, the refractive index variation along the grating vector of at least one of the one or more r-VBGs has a uniform period. In embodiments, the refractive index variation along the grating vector of at least one of the one or more r-VBGs is chirped. In embodiments, the non-zero angle between the normal vector of the input face and the grating vector of at least one of the one or more r-VBGs is 45 degrees.

In embodiments, at least one of the one or more r-VBGs is apodized.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
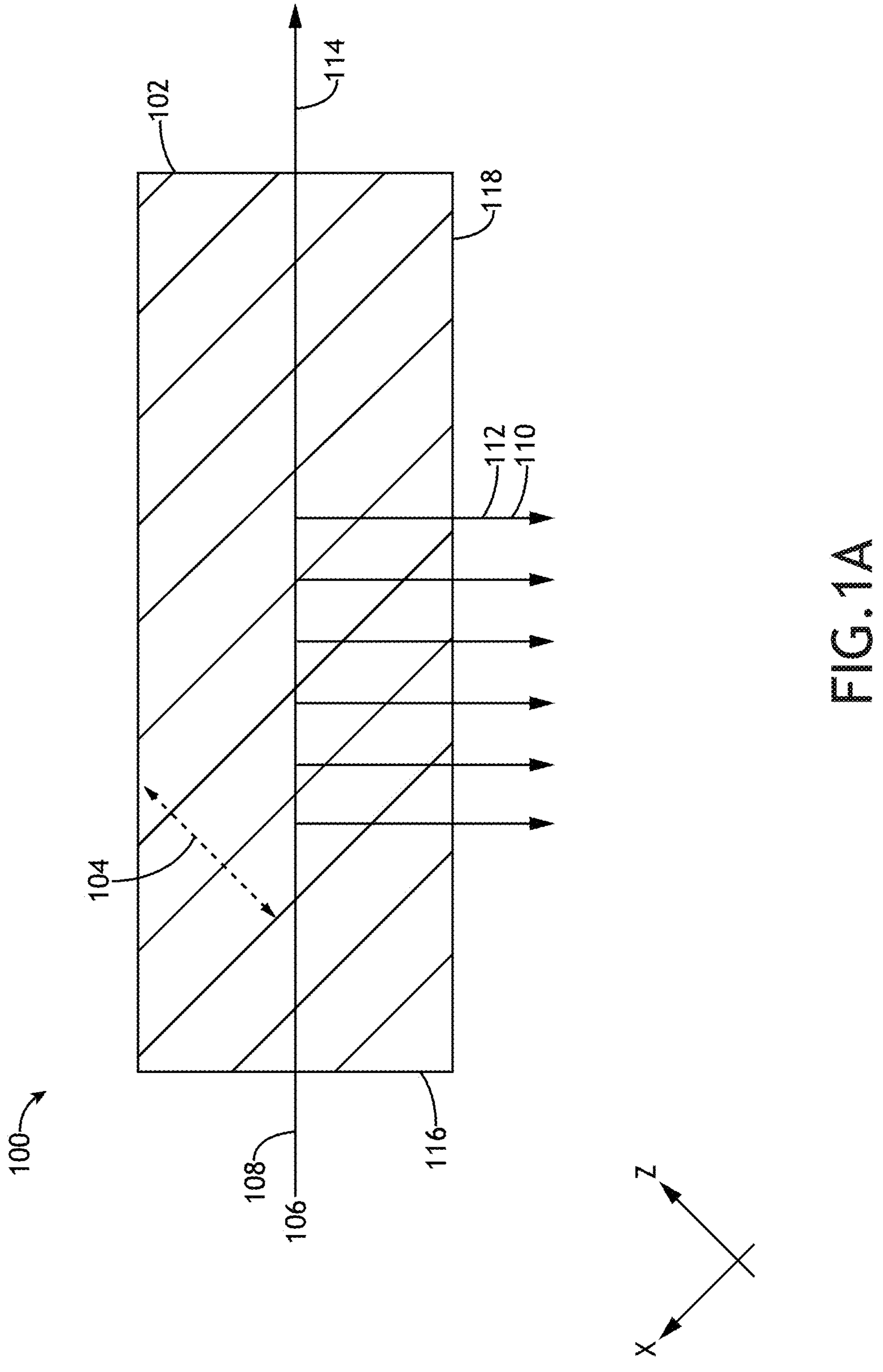
FIG. 1A is a top view of a rotated volume Bragg grating (r-VBG) with a uniform period, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing polarization-based optical isolation with one or more rotated volume Bragg gratings (r-VBGs). As used herein an r-VBG is formed as a VBG having a grating vector direction rotated relative to an input face of a material or an expected direction of incident light.

VBGs are generally described in Igor V. Ciapurin, et al., "Modeling of phase volume diffractive gratings, part 1: transmitting sinusoidal uniform gratings," Optical Engineering 45 (2006) 015802, 1-9; and Igor V. Ciapurin, et al., "Modeling of phase volume diffractive gratings, part 2: reflecting sinusoidal uniform gratings, Bragg mirrors," Optical Engineering 51 (2012) 058001, 1-10, both of which are incorporated herein by reference in their entireties. Further, transmissive VBGs (e.g., VBGs for which light satisfying a Bragg condition is diffracted as a transmitted beam) configured as transmissive phase masks are described generally in U.S. Patent Publication No. 2016/0116656 published on Apr. 28, 2016, which is incorporated herein by reference in its entirety.

R-VBGs are described generally in Mhibik, Oussama, et al. "Rotated chirped volume Bragg gratings for compact spectral analysis." Optics Letters 48.5 (2023): 1180-1183; Mhibik, Oussama, et al. "Compact dual-band spectral analysis via multiplexed rotated chirped volume Bragg gratings." Optics Letters 48.19 (2023): 5137-5140; and Yessenov, Murat, et al. "Ultra-compact synthesis of space-time wave packets." Optics Letters 48.10 (2023): 2500-2503; all of which are incorporated herein by reference in their entireties.

Some embodiments of the present disclosure are directed to one or more r-VBGs configured for use as a polarization-sensitive element such as, but not limited to, an optical isolator or a polarizing beamsplitter. In some embodiments, an optical isolator includes a quarter waveplate or other polarization controlling optics coupled with one or more r-VBGs to provide that retroreflected light is diverted from the original incidence direction by the one or more r-VBGs. In this configuration, input light propagates through the one or more r-VBGs via either transmission or reflection and then through polarization-controlling optics configured to rotate a polarization of retroreflected light by 90 degrees. Such retroreflected light may then be diverted from the original incidence direction through reflection or transmission by the one or more r-VBGs and thus prevent such retroflected light from propagating back along the original incidence direction.

Various designs of optical isolators incorporating one or more r-VBGs are contemplated herein. For example, an optical isolator may include a single r-VBG with a refractive index variation having a uniform (e.g., constant) or chirped period along its grating vector. Such a configuration may effectively isolate light around a single wavelength. As another example, an optical isolator may include multiplexed r-VBGs with the same or different grating vectors. Such a configuration may increase isolation efficiency and/or allow for isolation from multiple return wavelengths.

Some embodiments of the present disclosure are directed to a polarized optical source including a light source and an optical isolator including an r-VBG and polarization controlling optics. In this configuration, the light source may be protected from certain return reflections of the same or different wavelengths than provided by the light source.

Some embodiments of the present disclosure are directed to a polarization analyzer including an r-VBG and detectors along the transmission and/or reflection paths. In this way, the detectors may generate detection signals indicative of light in the transmission and reflection paths, where a ratio of the detection signals is indicative of a polarization state of input light.

Referring now to FIGS. 1A-7, systems and methods for polarization control with an r-VBG are described in greater detail, in accordance with one or more embodiments of the present disclosure.

FIGS. 1A-1I illustrate the propagation of light of through an r-VBG 100, in accordance with one or more embodiments of the present disclosure.

A VBG may be formed as a grating structure associated within the volume of material 102 with a periodic variation of refractive index along a grating vector direction 104

$$k = \frac{2\pi}{d}.$$

The material may include a photosensitive material or any other suitable material. This grating structure is typically extended in directions perpendicular to the grating vector direction 104. Put another way, a VBG may typically have a constant refractive index within any plane normal to the grating vector direction 104, where the refractive index along the grating vector direction 104 varies periodically. Further, a VBG may generally have any selected variation of the refractive index along the grating vector direction 104 so long as a Bragg condition is satisfied for at least one wavelength in at least a portion of the VBG. For example, the refractive index n of a traditional VBG may be a simple sinusoidal function with a constant (e.g., uniform) period along the grating vector direction 104. As another example, the refractive index n of a chirped VBG may have a variable period along the grating vector direction 104 and may thus satisfy a Bragg condition for different wavelengths at different locations. As another example, the refractive index variation (δn) of an apodized VBG may vary along the grating vector direction 104.

An r-VBG 100 may then be formed as a VBG with a grating vector direction 104 oriented at an angle from an expected incidence direction 106 of input light 108 (e.g., an input beam) or at an angle with respect to an input face 116 of the material in which the VBG is formed. Similarly, an r-VBG 100 may generally have any refractive index distribution along the grating vector direction 104 that satisfies a Bragg condition for light of at least one wavelength incident along the incidence direction 106.

Figure 1B:
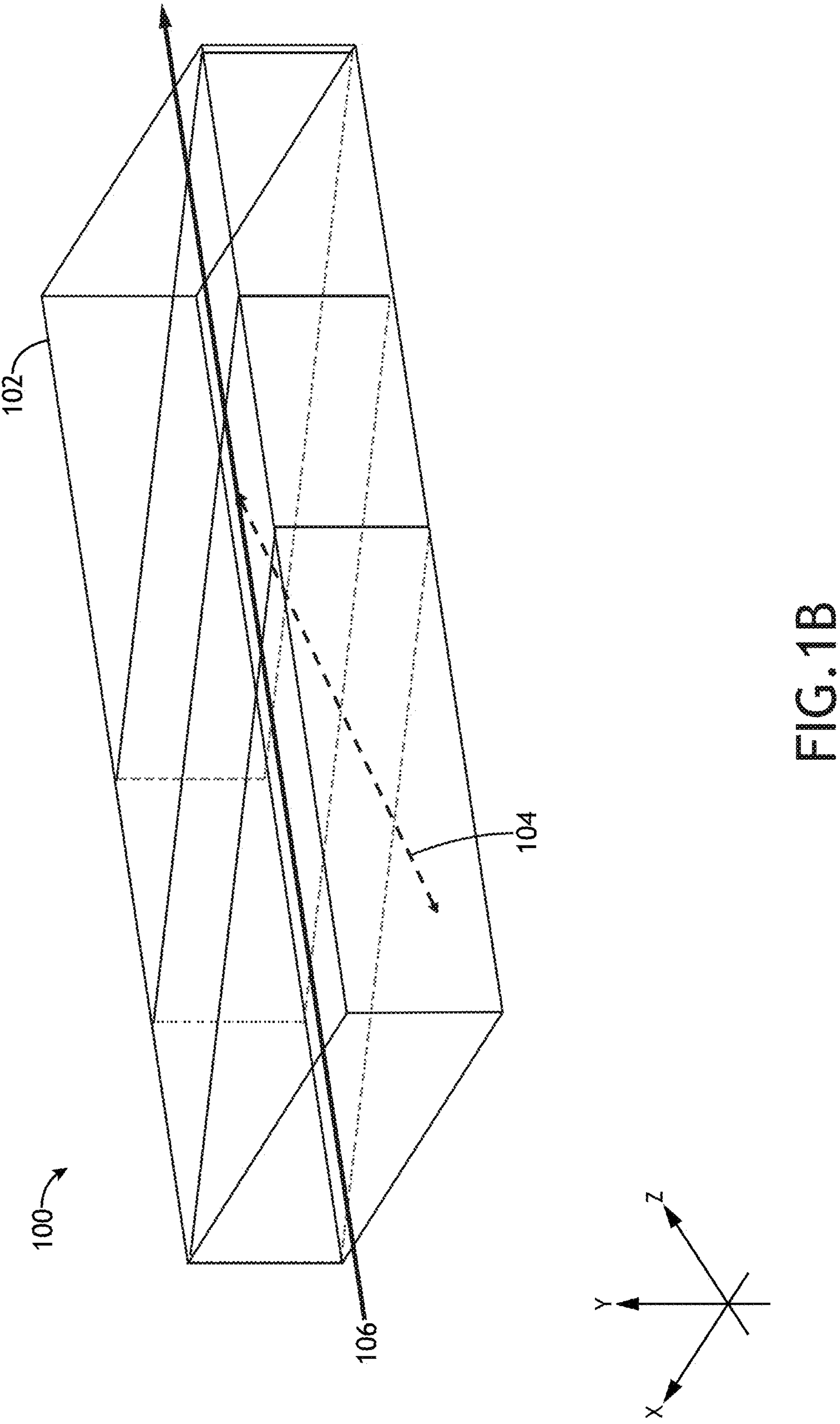
FIG. 1B is a perspective view of the r-VBG of FIG. 1A, in accordance with one or more embodiments of the present disclosure.

FIG. 1A is a top view of an r-VBG 100 with a uniform period, in accordance with one or more embodiments of the present disclosure. FIG. 1B is a perspective view of the r-VBG 100 of FIG. 1A, in accordance with one or more embodiments of the present disclosure.

In FIGS. 1A and 1B, the grating vector direction 104 corresponds to a Z axis. The refractive index variation of the r-VBG 100 depicted in FIGS. 1A and 1B may then be characterized as:

$$n(z) = n_0 + \delta n \cos\left(\frac{2\pi}{\Lambda_0} \cdot z\right) \tag{1}$$

where $n_0$ is an average refractive index of a material 102 in which the r-VBG 100 is formed, δn is a refractive index contrast, and $\Lambda_0$ is a period of the refractive index variation along the grating vector direction 104. Further, the refractive index at any particular value of z may be constant along a corresponding plane orthogonal to the grating vector direction 104 (e.g., an X-Y plane). It is noted that the figures depict variations of refractive index along the grating vector direction 104 as simple lines, but this is merely illustrative and should not be interpreted as limiting the scope of the present disclosure. It is to be understood that Equation (2) is merely illustrative and not limiting on the scope of the present disclosure. Rather, an r-VBG 100 may include any refractive index distribution suitable for reflecting light via Bragg reflection. For example, as will be described in greater detail below, the period of the refractive index variation ($\Lambda_0$) may vary along the grating vector direction 104 (e.g., forming a chirped r-VBG 100). As another example, the refractive index contrast (δn) may also vary along the grating vector direction 104, which is referred to herein as apodization such that an r-VBG 100 with a refractive index contrast (δn) that varies along the grating vector direction 104 is an apodized r-VBG 100. In this configuration, the diffraction efficiency may also vary along the grating vector direction 104.

An r-VBG 100 may reflect light via Bragg diffraction when a Bragg condition is satisfied for a particular wavelength and incidence direction 106 and transmit light otherwise. For example, FIGS. 1A and 1B depict input light 108 along an incidence direction 106, where a portion of the input light 108 is reflected via Bragg diffraction along a reflection direction 110 (e.g., as reflected light 112) and a portion of the input light 108 is transmitted along the input light 108 (e.g., as transmitted light 114). Notably, the incidence direction 106 and the reflection direction 110 lie within a diffraction plane (e.g., a plane of diffraction) formed by the grating vector direction 104 and the incidence direction 106. In FIGS. 1A and 1B, the diffraction plane corresponds to the X-Z plane. Notably, reflected light 112 and transmitted light 114 also lie within the diffraction plane.

The reflected light 112 may be spatially extended (e.g., spatially chirped) along the incidence direction 106 as demonstrated in FIG. 1A. The extent of the spatial chirp along the incidence direction 106 may depend on various factors such as, but not limited to, a diffraction efficiency of Bragg diffraction that produces the reflected light 112. In this way, the depiction of six rays of reflected light 112 in FIG. 1A is merely illustrative and should not be interpreted as limiting the present disclosure. Further, the depiction of the location of the reflected light 112 along the incidence direction 106 is also merely illustrative and should not be interpreted as limiting the present disclosure. Some figures depict reflected light 112 as a single ray, but this is again for illustrative purposes and should not be interpreted as limiting the present disclosure.

The reflected wavelength (e.g., a wavelength at which a Bragg condition is satisfied) may be characterized by:

$$\lambda(\phi) = 2\Lambda_0\sqrt{n_0^2 - \sin^2\phi} \tag{2}$$

where ϕ is an angle between the grating vector direction 104 and an incidence direction 106. Equation (2) illustrates that the reflected wavelength decreases as the angle ϕ increases between 0 and 45 degrees. Further, for the particular case of $\phi=45°$, the reflected wavelength is $\lambda(45°)=\sqrt{2}\Lambda_0 n_0$.

It is contemplated herein that the material 102 in which an r-VBG 100 is formed may have any shape and/or any number of faces at any orientation with respect to the grating vector direction 104. In some embodiments, an r-VBG 100 and one or more faces of the material 102 are co-designed to provide that light propagates normally through one or more faces. Such a configuration may be useful for, but not limited to, mitigating dispersion at the face. For example, as depicted in FIG. 1A, the grating vector direction 104 may be oriented at a non-zero angle with respect to a normal of an input face 116, which may be suitable for, but not limited to, applications in which input light 108 is expected to propagate through the input face 116 at normal incidence. As another example, as also depicted in FIG. 1A, an output face 118 may be oriented such that reflected light 112 (e.g., of a known wavelength based on a known incidence direction 106) exits the material 102 through the output face 118 at normal incidence.

Figure 1C:
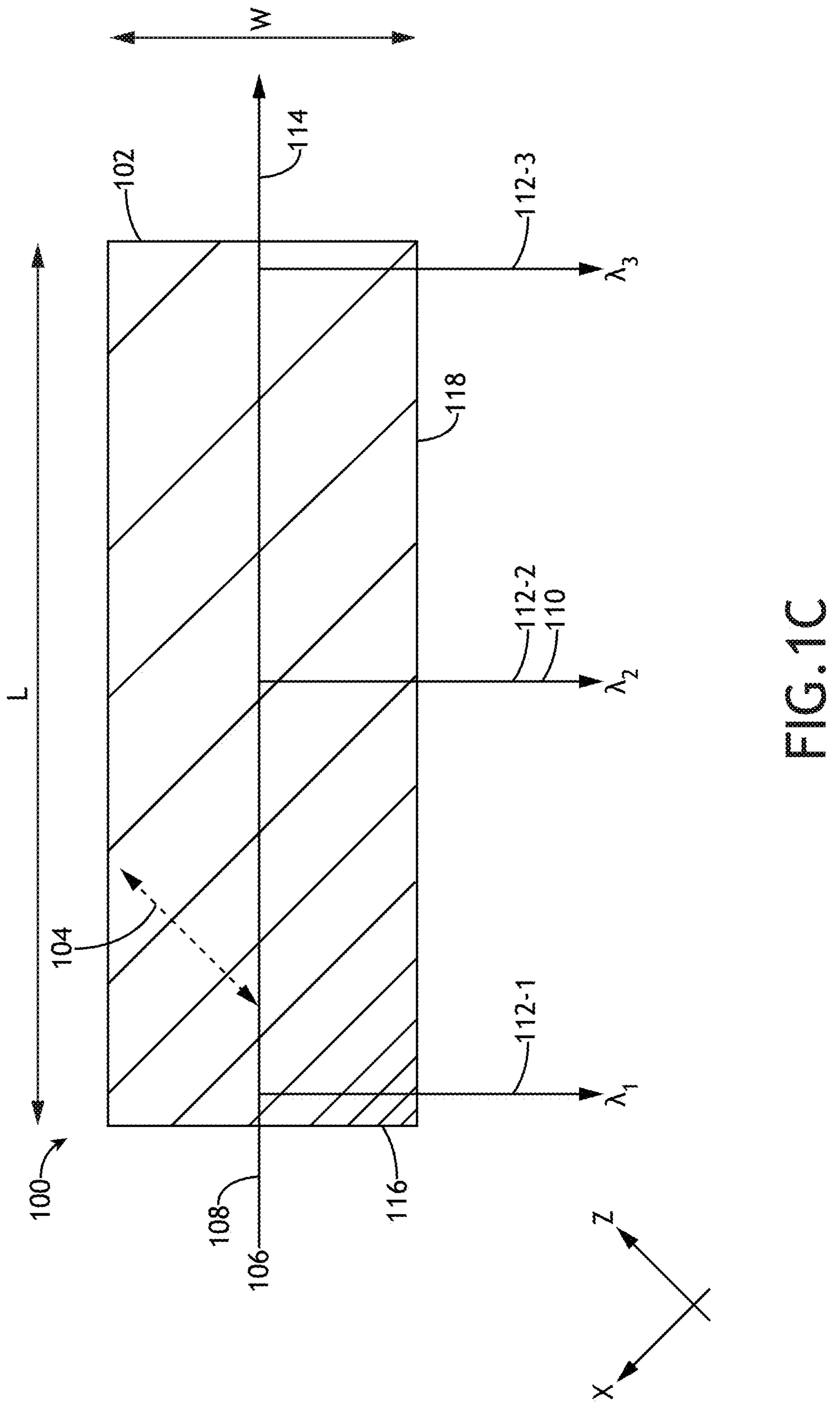
FIG. 1C is a top view of an r-VBG with linear chirp along the grating vector direction, in accordance with one or more embodiments of the present disclosure.

Referring now to FIG. 1C, the properties of an r-VBG 100 with a non-uniform refractive index distribution along the grating vector direction 104 (e.g., a chirped distribution) is described.

As indicated previously herein, an r-VBG 100 may generally have any refractive index distribution along the grating vector direction 104 that satisfies a Bragg condition for light of at least one wavelength propagating along an incidence direction 106 that is different than the grating vector direction 104. In some embodiments, a period of the refractive index variation varies monotonically along the grating vector direction 104 (e.g., monotonically increases or decreases). For example, the period may vary linearly, quadratically, or by any other distribution. An r-VBG 100 with a non-uniform refractive index variation along the grating vector direction 104 may be referred to as a rotated chirped Volume Bragg grating and may be abbreviated as r-CVBG or r-CBG.

FIG. 1C is a top view of an r-VBG 100 with linear chirp along the grating vector direction 104, in accordance with one or more embodiments of the present disclosure. For example, the refractive index variation of an r-VBG 100 with linear chirp may be characterized as:

$$n(z)=n_0+\delta n\cos\{Qz+\beta(z-0.5L)^2\} \quad (3)$$

where $$Q \approx \frac{4\pi}{\lambda_0} n_0,$$

$\beta$ is a chirp rate, and L is a length of the r-VBG 100 along the incidence direction 106.

In this configuration, different wavelengths are reflected by the r-VBG 100 at different depths along the incidence direction 106. Put another way, the Bragg condition may be satisfied for different wavelengths at different depths along the incidence direction 106. This is illustrated in FIG. 1C by a first ray of reflected light 112-1 with a first wavelength $\lambda_1$ at a first depth along the incidence direction 106, a second ray of reflected light 112-2 with a second wavelength $\lambda_2$ at a second depth along the incidence direction 106, and a third ray of reflected light 112-3 with a third wavelength $\lambda_3$ at a third depth along the incidence direction 106. More particularly, it can be shown for the configuration of FIG. 1C that the reflected wavelength may be characterized as:

$$\lambda(z) = \lambda_0 - \gamma z \quad (4)$$

$$\text{and } \gamma = \frac{\lambda_0^2}{2\pi n_0}\beta, \quad (5)$$

where $\lambda_0$ is a first reflected wavelength.

As a result, the reflected light 112 may be spectrally chirped (e.g., spectrally resolved) along the incidence direction 106 and also temporally chirped due to the difference in path lengths as a function of wavelength. A spectrally resolved bandwidth $\Delta\lambda$ (e.g., a resolution of the r-VBG 100) may be characterized as:

$$\Delta\lambda = \frac{n_0|\gamma|}{\sqrt{n_0^2 - \sin^2\phi}} \cdot L. \quad (6)$$

Accordingly, the resolved bandwidth may generally be increased by increasing the length of the r-VBG 100 along the incidence direction 106 (L). The primary constraint on the width W of the r-VBG 100 orthogonal to the incidence direction 106 is diffraction as it propagates along the incidence direction 106.

Figure 1D:
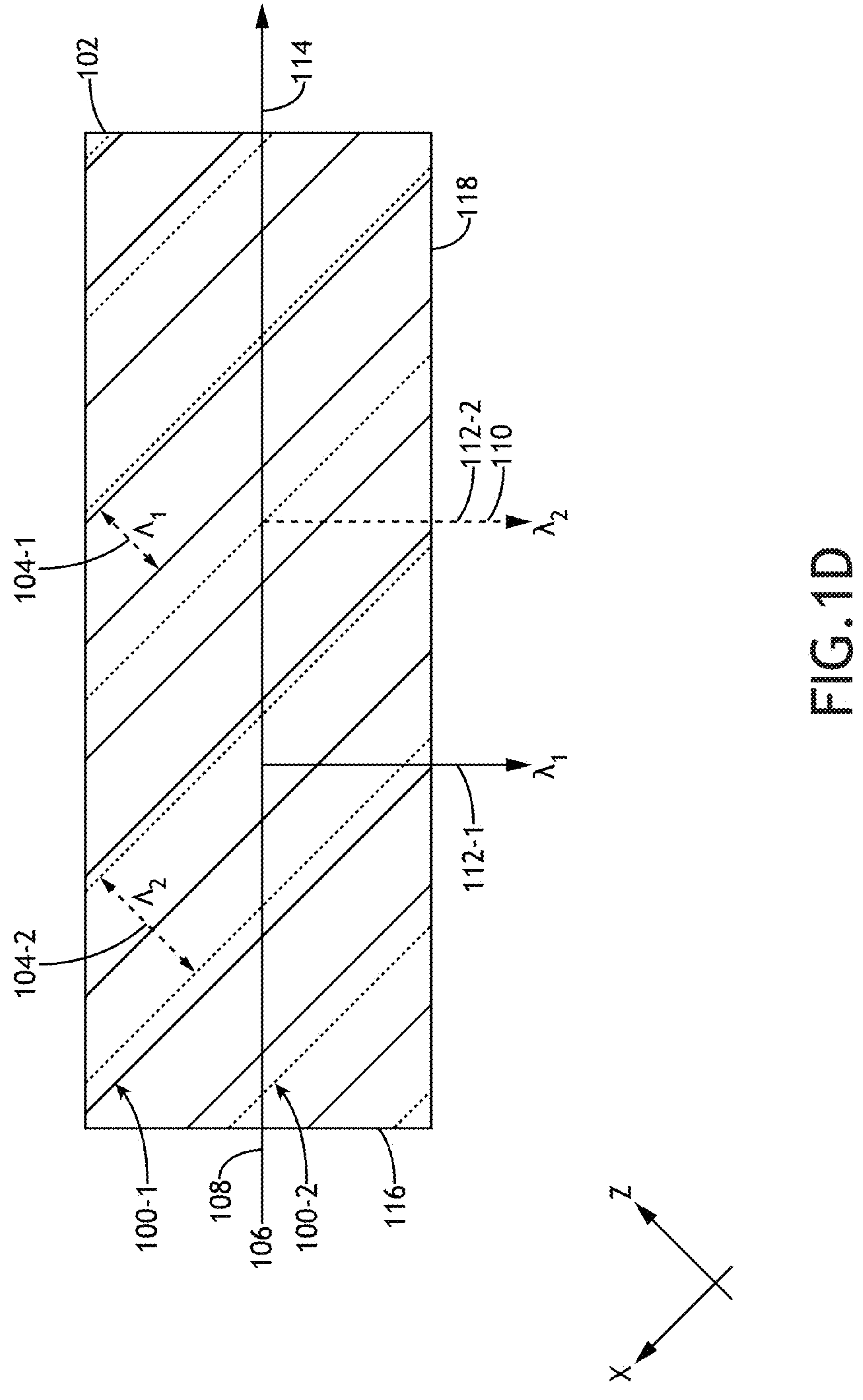
FIG. 1D is a top view of a material including two multiplexed r-VBGs with a common grating vector direction, in accordance with one or more embodiments of the present disclosure.
Figure 1E:
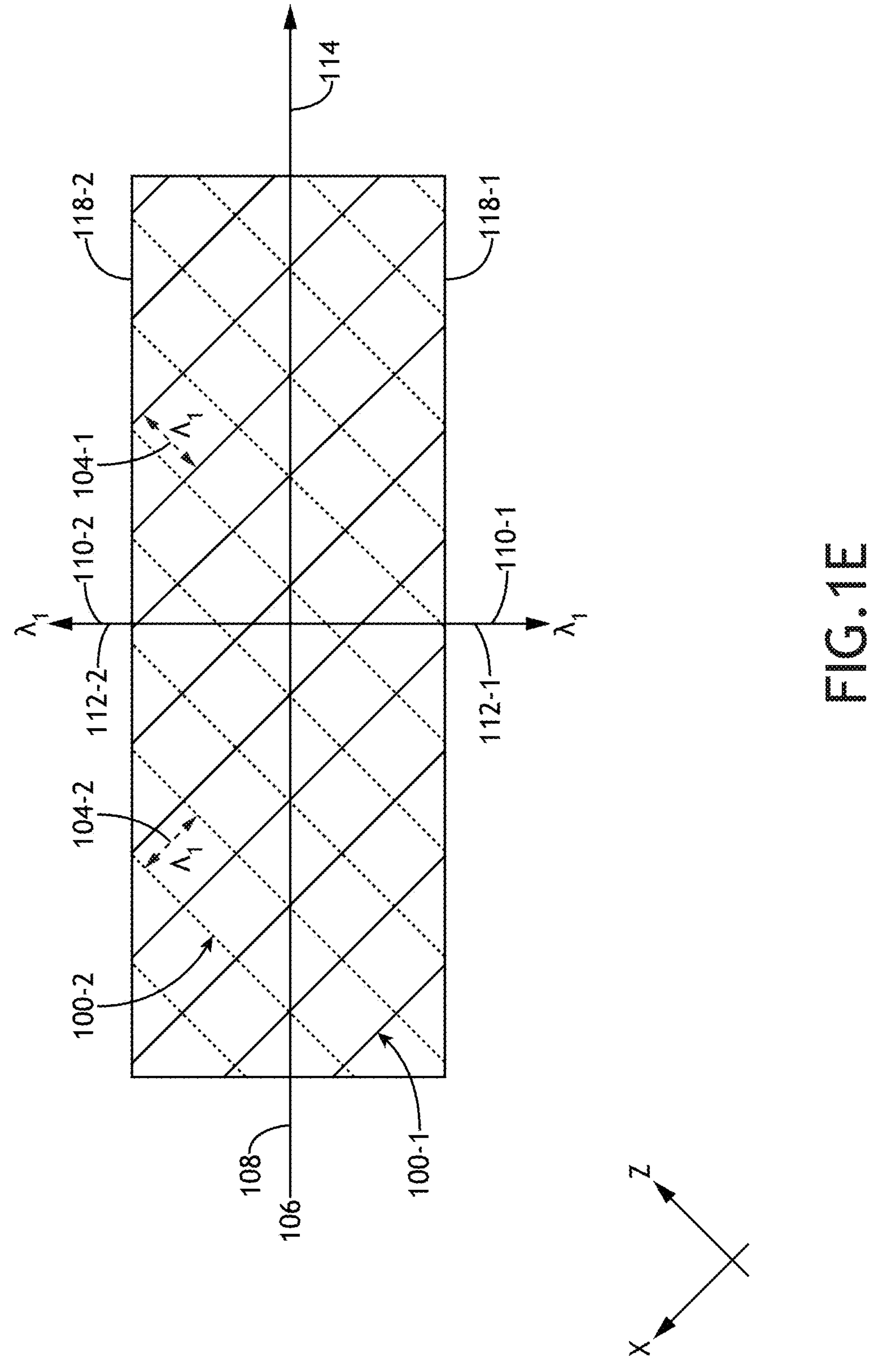
FIG. 1E is a top view of a material including two multiplexed r-VBGs with different grating vector directions but common periods along the respective grating vector directions, in accordance with one or more embodiments of the present disclosure.
Figure 1F:
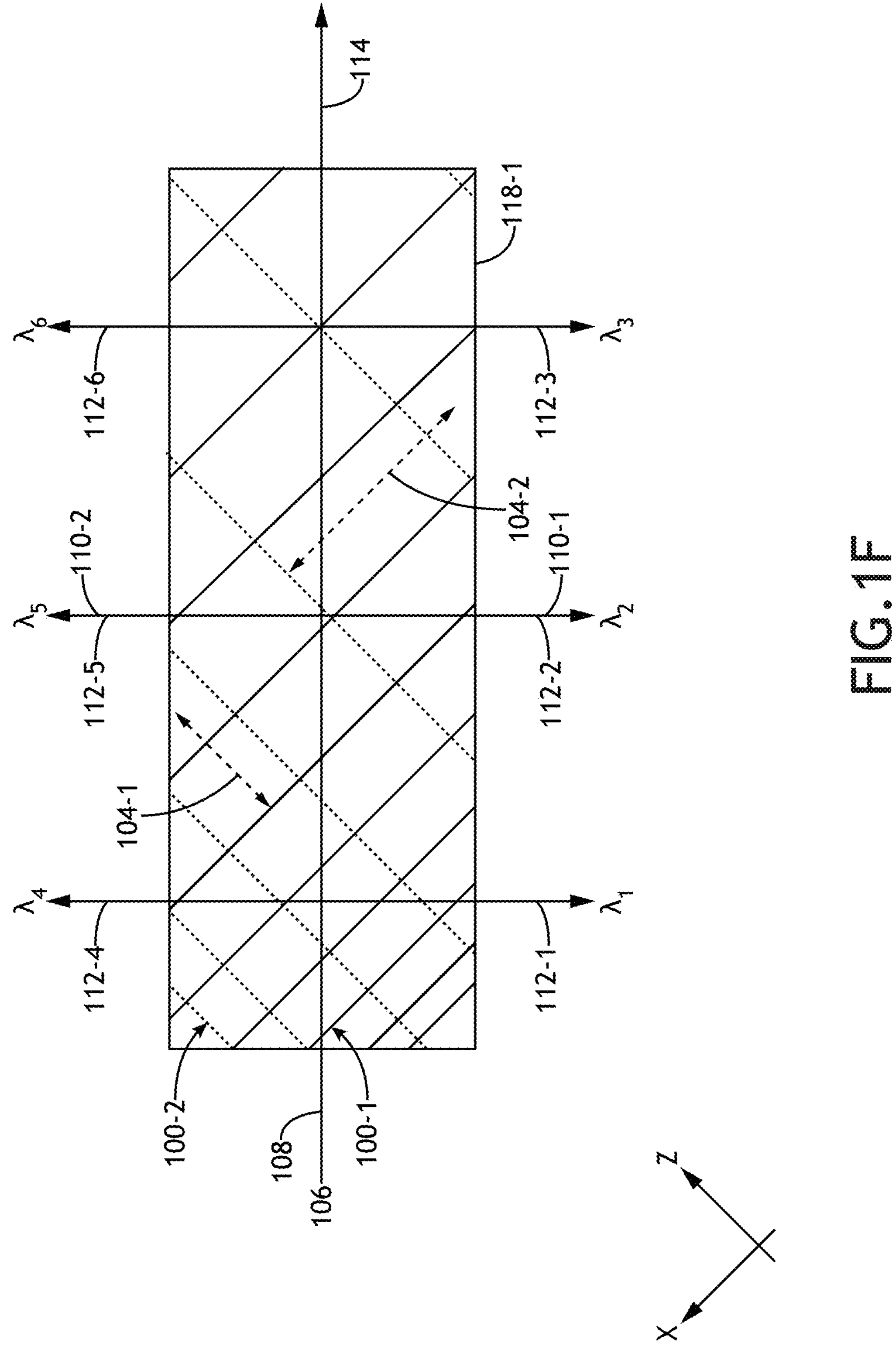
FIG. 1F is a top view of a material including two multiplexed chirped r-VBGs with different grating vector directions, in accordance with one or more embodiments of the present disclosure.

Referring now to FIGS. 1D-1F, the fabrication of multiple r-VBGs 100 within a common volume of material 102 (e.g., multiplexed fabrication) is described in greater detail, in accordance with one or more embodiments of the present disclosure.

In a general sense, any number of r-VBGs 100 of any type (e.g., uniform, chirped, apodized, or the like) may be fabricated in a common volume of a material 102. Further, each r-VBG 100 may have a grating vector direction 104 along any selected direction. For example, multiple r-VBGs 100 may be fabricated within a common volume that have a common grating vector direction 104 but different refractive index distributions along the common grating vector direction 104 (e.g., different uniform periods, different chirp rates, or the like). Such a configuration may be suitable for, but not limited to, generating multiple beams of reflected light 112 out of a single output face. As another example, multiple r-VBGs 100 may be fabricated within a common volume that have different grating vector directions 104, where the r-VBGs 100 may have the same or different refractive index distributions along the respective grating vector directions 104. Such a configuration may be suitable for, but not limited to, generating multiple beams of reflected light 112 that propagate along different directions and potentially out of different output faces.

FIG. 1D is a top view of a material 102 including two multiplexed r-VBGs 100 with a common grating vector direction 104, in accordance with one or more embodiments of the present disclosure. In FIG. 1D, a first r-VBG 100-1 is substantially similar to FIG. 1A and has a first uniform period $\Lambda_1$ along a first grating vector direction 104-1, while a second r-VBG 100-2 has a second uniform period $\Lambda_2$ along a second grating vector direction 104-2 oriented parallel to the first grating vector direction 104-1. FIG. 1D further depicts input light 108, reflected light 112-1 corresponding to a first wavelength $\lambda_1$ (shown as solid lines) that is reflected by the first r-VBG 100-1 (e.g., the first wavelength $\lambda_1$ satisfies a Bragg condition for the first r-VBG 100-1), and a second beam of reflected light 112-2 corresponding to a second wavelength $\lambda_2$ (shown as dashed lines) that is reflected by the second r-VBG 100-2 (e.g., the second wavelength $\lambda_2$ satisfies a Bragg condition for the second r-VBG 100-2). Notably, the reflected light 112-1 and the reflected light 112-2 exit from the same output face 118. Further, the reflected light 112-1 and the reflected light 112-2 are each shown as single rays for clarity. However, as illustrated in FIG. 1A, the reflected light 112-1 and/or the reflected light 112-2 may be spatially chirped along the incidence direction 106.

FIG. 1E is a top view of a material 102 including two multiplexed r-VBGs 100 with different grating vector directions 104 but common periods $\Lambda_1$ along the respective grating vector directions 104, in accordance with one or more embodiments of the present disclosure. In FIG. 1E, a first r-VBG 100-1 has a first grating vector direction 104-1 oriented to provide reflected light 112-1 along a first reflection direction 110-1. A second r-VBG 100-2 has a second grating vector direction 104-2 oriented to provide reflected light 112-2 along a second reflection direction 110-2. FIG. 1E depicts a particular configuration in which the first grating vector direction 104-1 is orthogonal to the second grating vector direction 104-2 and both grating vector direction 104 are oriented at 45-degrees relative to the incidence direction 106. In this configuration, the reflected light 112-1 exits from a first output face 118-1 and the reflected light 112-2 exits from a second output face 118-2. Further, the reflected light 112-1 and the reflected light 112-2 from the two r-VBGs 100 have the same wavelength. Configurations such as this in which multiplexed r-VBGs 100 have grating vector directions 104 oriented with both positive and negative angles with respect to the incidence direction 106 to provide reflected light 112 from different output faces 118 (e.g., output faces 118-1, 118-2) are referred to herein as an X-configuration. However, it is to be understood that FIG. 1E and the associated description are merely illustrative and should not be interpreted as limiting the scope of the present disclosure. Multiplexed r-VBGs 100 may generally have any grating vector directions 104, which may result in potentially different wavelengths of associated reflected light 112 along associated reflection directions.

FIG. 1F is a top view of a material 102 including two multiplexed chirped r-VBGs 100 with different grating vector directions 104, in accordance with one or more embodiments of the present disclosure. In particular, FIG. 1F depicts a first r-VBG 100-1 with a first refractive index distribution along a first grating vector direction 104-1 and a second refractive index distribution along a second r-VBG 100-2 with second grating vector direction 104-2. As in FIG. 1E, the first grating vector direction 104-1 is orthogonal to the second grating vector direction 104-2 and oriented at 45-degrees relative to the incidence direction 106. In this way, the first r-VBG 100-1 may generate first reflected light 112 (shown as rays of reflected light 112-1 through 112-3) having a first wavelength distribution (represented as $\lambda_1$ through $\lambda_3$) that exits through a first output face 118-1, whereas the second r-VBG 100-2 may generate second reflected light 112 (shown as rays of reflected light 112-4 through 112-6) having a second wavelength distribution (represented as $\lambda_4$ through $\lambda_6$) that exits through a second output face 118-2. Again, the particular configuration depicted in FIG. 1F and the associated description are merely illustrative and should not be interpreted as limiting the scope of the present disclosure. In general, multiple r-VBGs 100 with different chirp distributions may have any grating vector directions 104 and may reflect light within any overlapping or non-overlapping spectral bands. Further, although not shown, any type of r-VBGs 100 may be multiplexed within a common volume including, but not limited to, uniform, chirped, or apodized r-VBGs 100.

Figure 1G:
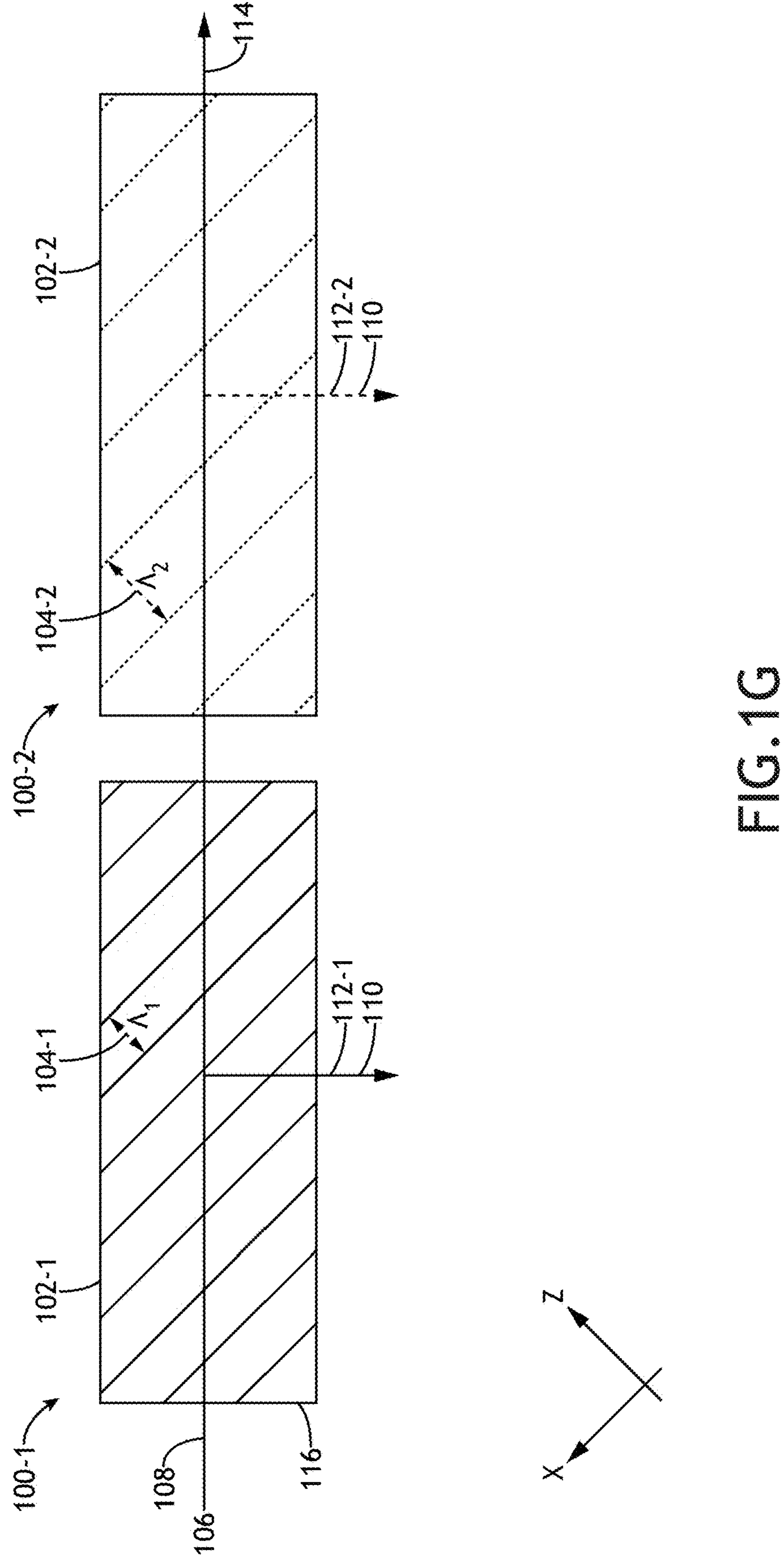
FIG. 1G is a top view of two cascaded r-VBGs, in accordance with one or more embodiments of the present disclosure.

Referring now to FIG. 1G, multiple r-VBGs 100 may be fabricated in separate materials 102 or separate portions of a common material 102 to form a device. Such a configuration may be referred to as a cascaded configuration. FIG. 1G is a top view of two cascaded r-VBGs 100, in accordance with one or more embodiments of the present disclosure. For example, FIG. 1G depicts a first r-VBG 100-1 in a first material 102-1 and a second r-VBG 100-2 in a second material 102-2, where the second r-VBG 100-2 receives transmitted light from the first r-VBG 100-1. FIG. 1G depicts a particular configuration that is similar to FIG. 1D, but where the first r-VBG 100-1 and the second r-VBG 100-2 are fabricated in different materials and are arranged in a cascaded configuration. As a result, the first reflected light 112-1 with the first wavelength and the second reflected light 112-2 may be spatially separated. FIG. 1G and the associated description are provided solely for illustration and should not be interpreted as limiting the scope of the present disclosure. For example, the first r-VBG 100-1 and the second r-VBG 100-2 may generally have any grating vector directions 104 and any distribution of refractive index along the respective grating vector directions 104 to provide any desired performance. As another example, single or multiplexed r-VBGs 100 may be cascaded. As another example, r-VBGs 100 need not be cascaded along the incidence direction 106, but may also be cascaded along a reflection direction 110. As another example, cascaded r-VBGs 100 may be located in different volumetric regions of a common material 102. In this way, any combination of r-VBGs 100 within one or more materials 102 is within the spirit and scope of the present disclosure.

Referring generally to FIGS. 1A-11, additional aspects of r-VBGs 100 are now described in greater detail. An r-VBG 100 may be fabricated in any material 102 that has transparency for the wavelength or wavelengths of interest including, but not limited to, wavelengths in ultraviolet, visible, or infrared spectral regions. This includes but is not limited to glasses, crystals, polymers, sol-gels, and others. Further, an r-VBG 100 may be fabricated using any technique known in the art such as, but not limited to, holographic recording techniques or direct laser writing techniques (e.g., femtosecond laser direct writing techniques).

Figure 1H:
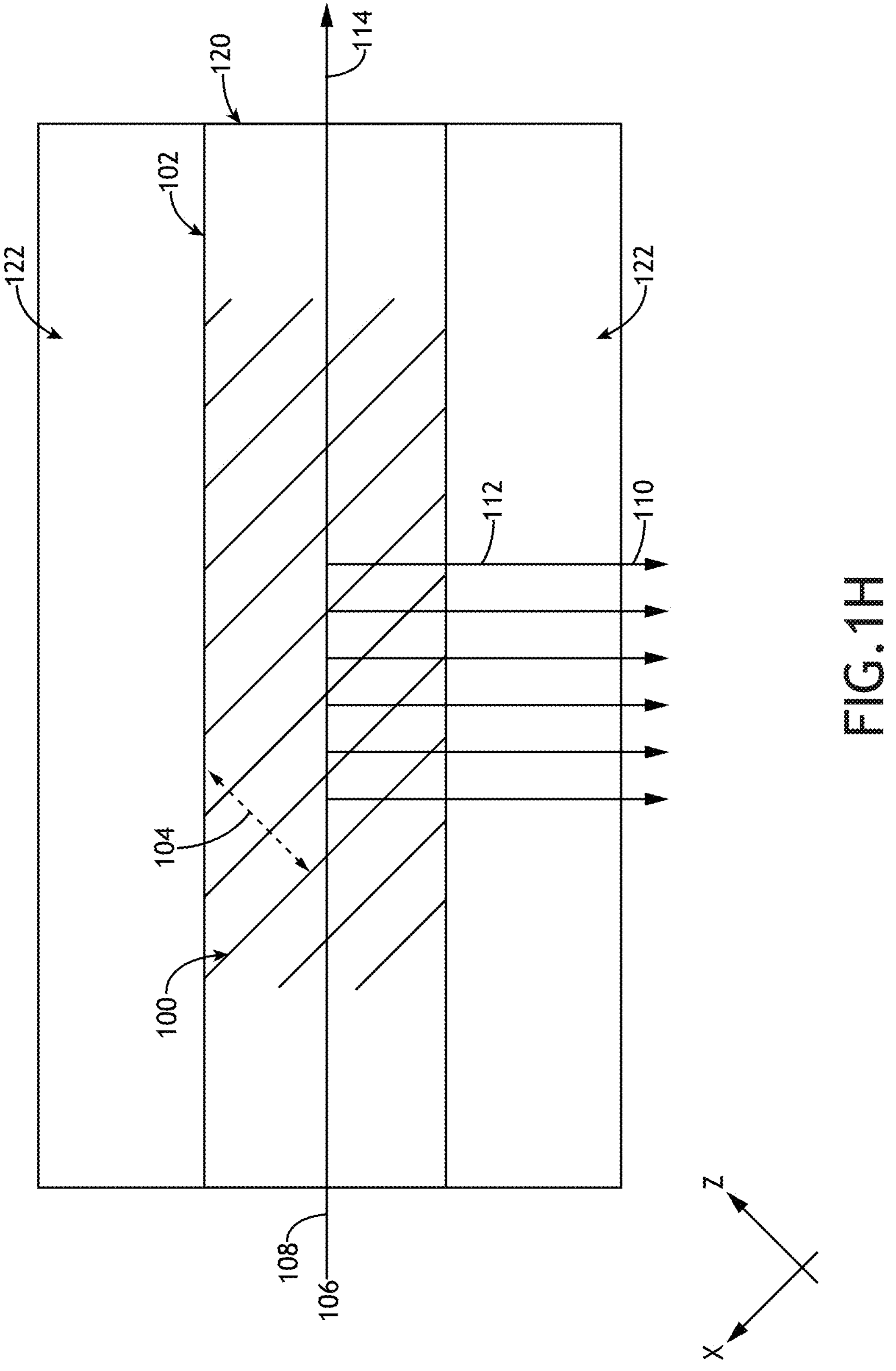
FIG. 1H is a top view of an r-VBG within a waveguide, in accordance with one or more embodiments of the present disclosure.

In some embodiments, an r-VBG 100 is fabricated within a waveguide 120. FIG. 1H is a top view of an r-VBG 100 within a waveguide 120, in accordance with one or more embodiments of the present disclosure. In FIG. 1H, the material 102 in which an r-VBG 100 is formed operates as a waveguide 120 and is at least partially surrounded by cladding material 122 providing a refractive index differential suitable for guiding light.

The waveguide 120 and surrounding cladding material 122 may have any structure known in the art suitable for guiding light. Further, the waveguide 120 may be surrounded by any material or combination of materials having lower refractive index than the waveguide 120. In some embodiments, the waveguide 120 including the r-VBG 100 is fully surrounded by one or more cladding materials 122. Such a configuration may be, but is not required to be, characterized as an embedded waveguide. For example, the waveguide 120 including the r-VBG 100 may be buried within the volume of bulk material 102. As another example, the waveguide 120 including the r-VBG 100 may be fabricated on a substrate and/or film and be surrounded by a cap layer having the same or different composition as the substrate and/or film. As another example, the waveguide 120 including the r-VBG 100 may the core of an optical fiber. In some embodiments, the waveguide 120 including the r-VBG 100 is partially surrounded by cladding material 122. Such a configuration may be, but is not required to be, characterized as a rib waveguide or a ridge waveguide.

Figure 1I:
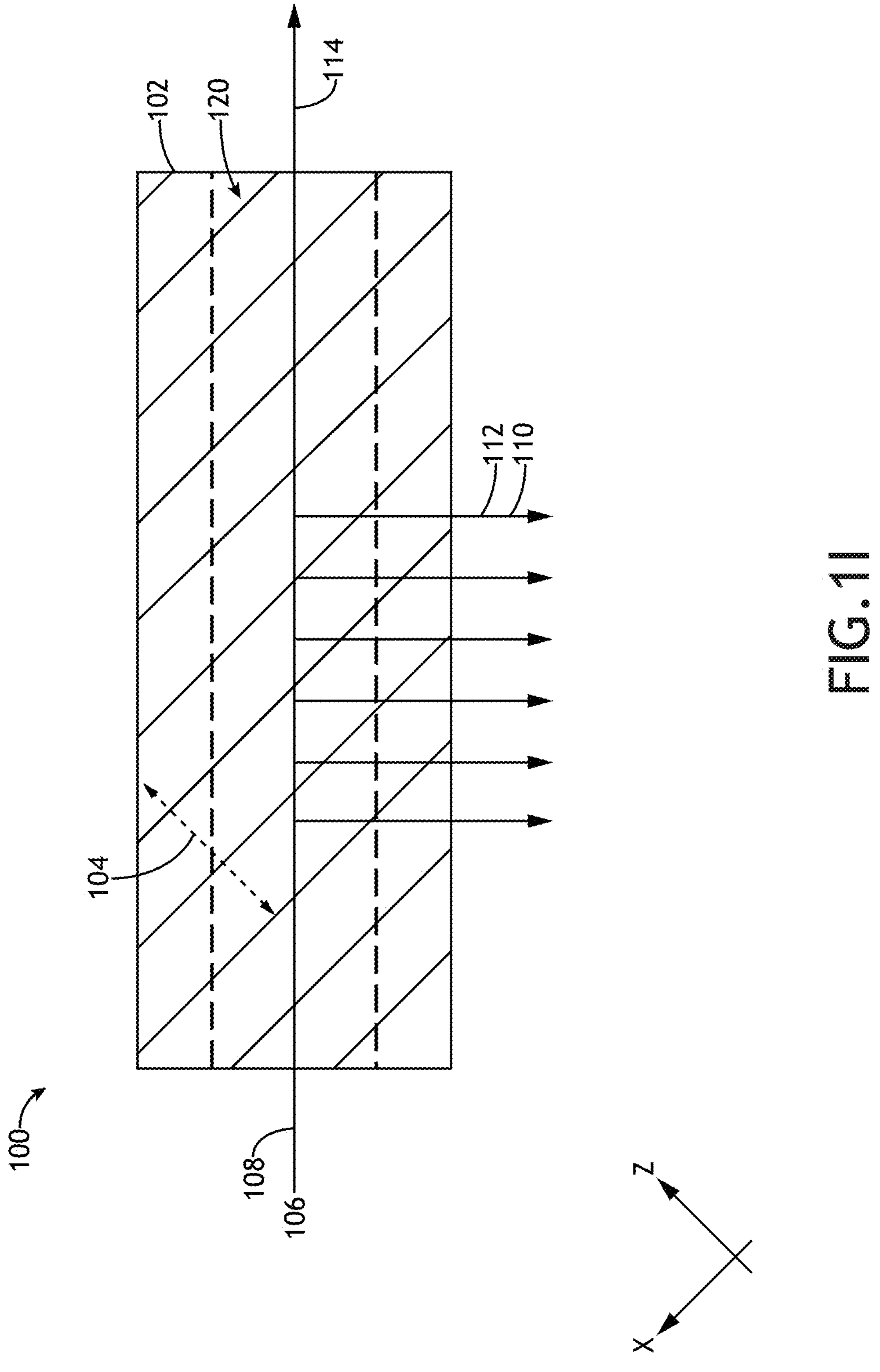
FIG. 1I is a top view of a waveguide within an r-VBG, in accordance with one or more embodiments of the present disclosure.

In some embodiments, a waveguide 120 is fabricated within an r-VBG 100. FIG. 1I is a top view of a waveguide 120 within an r-VBG 100, in accordance with one or more embodiments of the present disclosure. In this configuration, light may be guided as it propagates through the r-VBG 100 along the incidence direction 106.

Polarization-dependent properties of r-VBGs 100 are now described in greater detail in FIGS. 2A-7.

It is contemplated herein that an r-VBG 100 may operate as a polarization-sensitive element. In particular, an r-VBG 100 may reflect light that satisfies a Bragg condition (e.g., light having a wavelength satisfying a resonance condition of the r-VBG 100), where the diffraction efficiency of this reflection is polarization sensitive. Further, this polarization-sensitive behavior may be present for any refractive index distribution including, but not limited to, a uniform refractive index distribution or a chirped refractive index distribution.

It is noted that polarization may be expressed according to different conventions or definitions. In the present disclosure, a convention is used in which a polarization of light incident on an r-VBG 100 is characterized relative to the diffraction plane (e.g., a plane formed by the incidence direction 106 and the reflection direction 110 which corresponds to the X-Y plane in FIGS. 1A-1G).

It is contemplated herein that a diffraction efficiency of reflected light 112 from an r-VBG 100 may be minimum for light having a polarization within the diffraction plane (referred to herein as in-plane-polarized light) and maximum for light with a polarization orthogonal to the diffraction plane (referred to herein as out-of-plane-polarized light). As a result, an r-VBG 100 may isolate in-plane-polarized light from out-of-plane-polarized light.

Figure 2A:
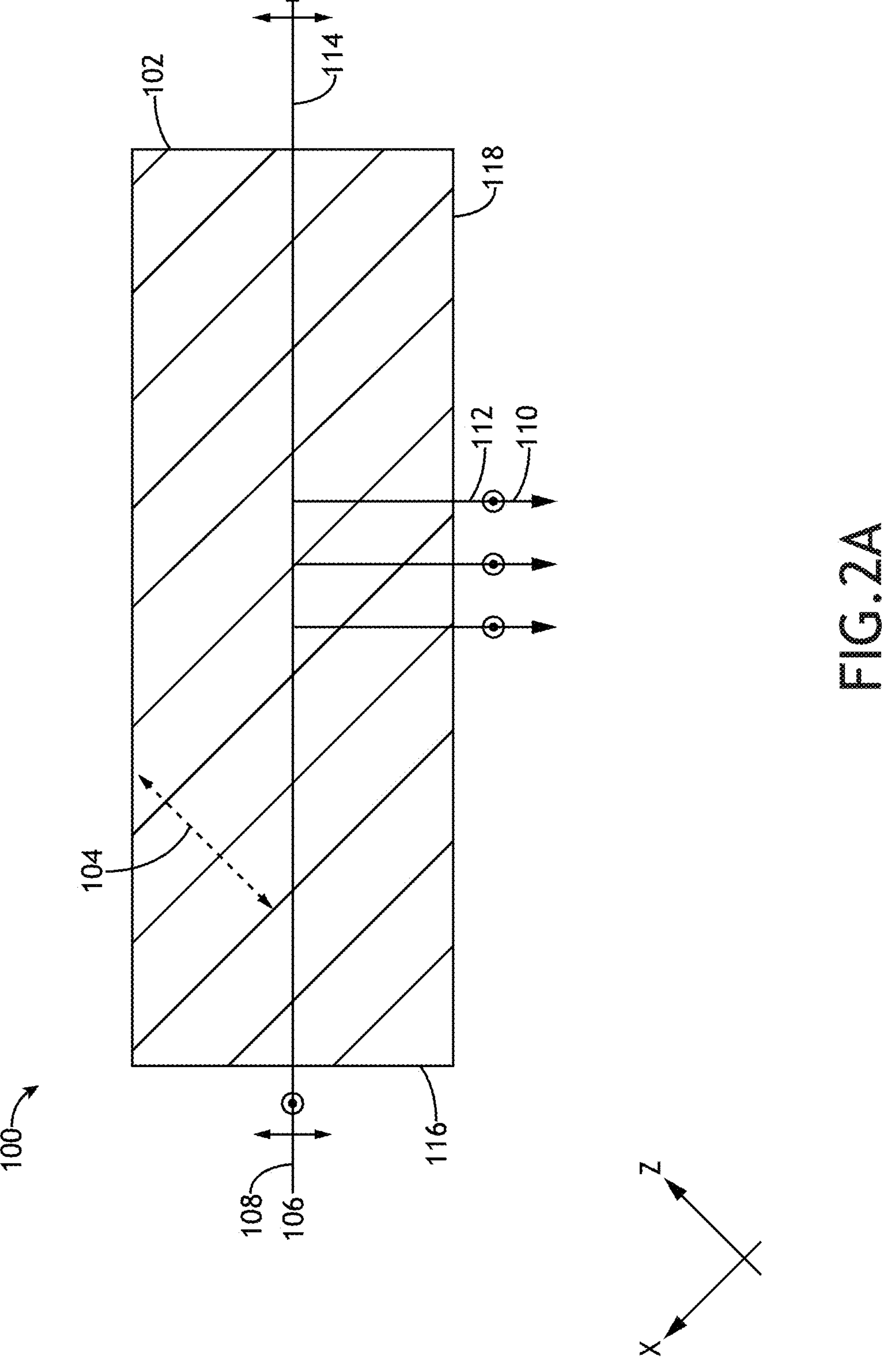
FIG. 2A is a simplified schematic depicting the polarization performance of an r-VBG with a uniform period of refractive index variation, in accordance with one or more embodiments of the present disclosure.

FIG. 2A is a simplified schematic depicting the polarization performance of an r-VBG 100 with a uniform period of refractive index variation, in accordance with one or more embodiments of the present disclosure. In FIG. 2A, input light 108 is shown has having both in-plane and out-of plane polarization. Portions of the input light 108 having in-plane polarization are transmitted as transmitted light 114, whereas portions of the input light 108 having out-of-plane polarization that satisfy a Bragg condition are reflected as reflected light 112. Remaining portions of the input light 108 are transmitted through the r-VBG 100 as transmitted light 114. For example, the transmitted light 114 may include portions of the input light 108 having in-plane polarization as well as portions of the input light 108 having out-of-plane polarization but wavelengths at which a Bragg condition is not satisfied.

Figure 2B:
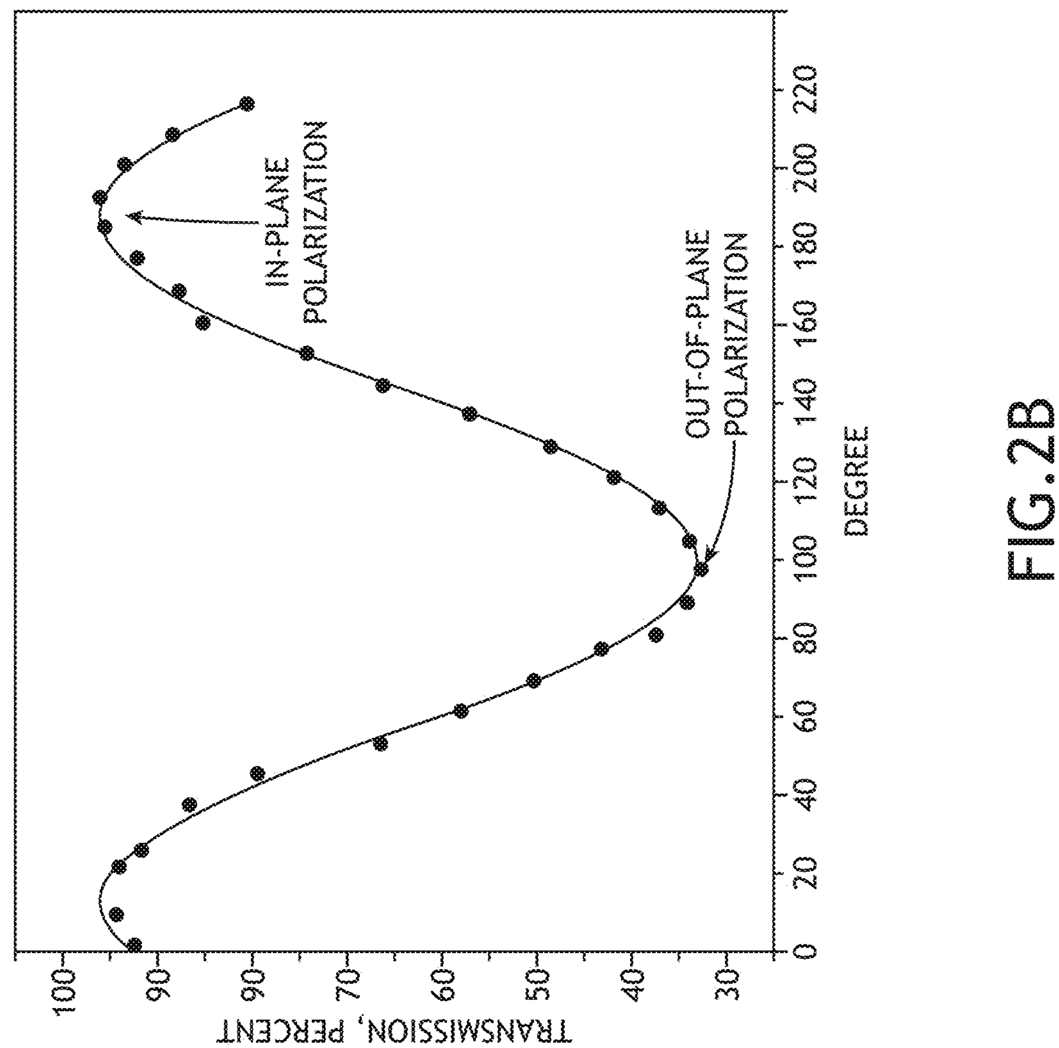
FIG. 2B is a simplified schematic depicting a plot of transmission of linearly-polarized input light through an r-VBG with a uniform period of refractive index variations in units of percentage, in accordance with one or more embodiments of the present disclosure.

FIG. 2B is a simplified schematic depicting a plot of transmission of linearly-polarized input light 108 through an r-VBG 100 with a uniform period of refractive index variations in units of percentage, in accordance with one or more embodiments of the present disclosure. The plot in FIG. 2B is generated by rotating the polarization of the input light 108 with a half-wave plate, where the X-axis of the plot corresponds to polarization direction of the input light 108. As shown in FIG. 2B, the r-VBG 100 provides high transmission when the input light 108 is in-plane polarized and low transmission (e.g., high reflection) when the input light 108 is out-of-plane polarized.

Figure 2C:
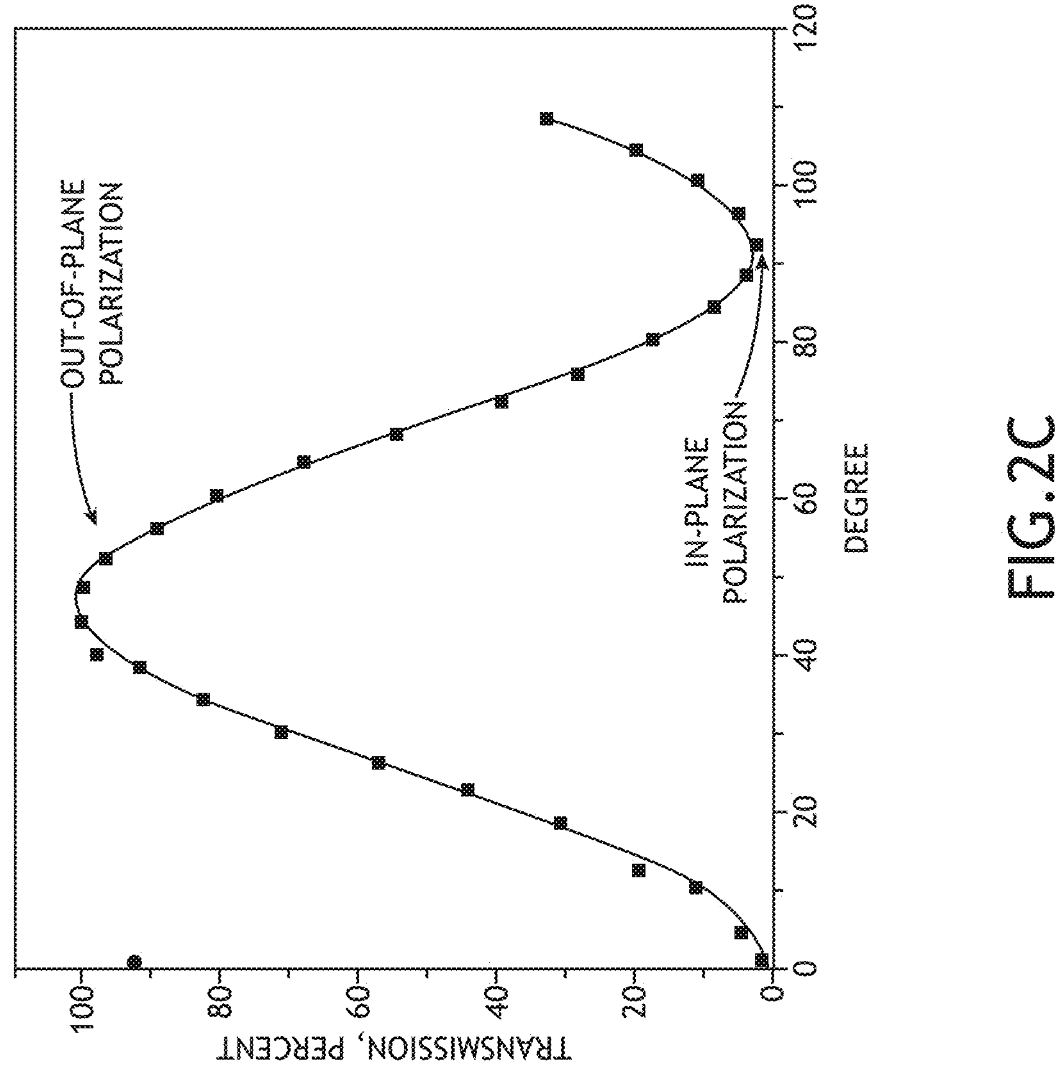
FIG. 2C is a plot of reflection of linearly-polarized input light through an r-VBG with a chirped distribution of refractive index variations in units of percentage, in accordance with one or more embodiments of the present disclosure.

FIG. 2C is a plot of reflection of linearly-polarized input light 108 through an r-VBG 100 with a chirped distribution of refractive index variations in units of percentage, in accordance with one or more embodiments of the present disclosure. Similar to FIG. 2B, the plot in FIG. 2C is generated by rotating the polarization of the input light 108 with a half-wave plate, where the X-axis of the plot corresponds to polarization direction of the input light 108. As shown in FIG. 2C, the r-VBG 100 provides high reflection when the input light 108 is out-of-plane polarized and low reflection (e.g., high transmission) when the input light 108 is in-plane polarized. Notably, the values of the polarization direction on the X axes of FIGS. 2B and 2C are not synchronized. Rather, the in-plane and out-of-plane directions are noted by arrows in the figures. Taken together, FIGS. 2B and 2C illustrate polarization-sensitive performance of both uniform and chirped r-VBGs 100. It is noted that FIGS. 2B and 2C depict some losses, which may be due to errors in a fabrication process. In general, the transmission and/or reflection characteristics (or alternatively an extinction ratio) that may be achieved may depend on the particular characteristics of a fabricated device, the angle of the grating vector direction 104 relative to the incidence direction 106, a diffraction efficiency of the grating, the polarization, the chirp rate (in case the grating is chirped), which may be tuned for different applications.

More generally, the orientation/rotation r-VBG 100 may impact the reflection/diffraction efficiency such that FIGS. 2B-2C are merely illustrative. The reflection efficiency also depends on the length of the grating, on its refractive index modulation, and on its period. The grating itself could be uniform, apodised or chirped. An r-VBG 100 with a uniform periodic refractive index variation may operate at much narrower spectral region compared to a chirped r-VBG 100. A chirped r-VBG 100 may also operate at multiple discrete wavelengths (with certain spectral width on their own) or with sources having broad emission.

Referring now to FIGS. 3A-7, various polarization-sensitive devices incorporating one or more r-VBGs 100 are described in greater detail, in accordance with one or more embodiments of the present disclosure.

In some embodiments, one or more r-VBGs 100 may operate as a polarization isolator or polarization-dependent beamsplitter based on the polarization sensitivity depicted in FIGS. 2A-2C. For example, any of the designs of single, multiplexed, or cascaded r-VBGs 100 depicted in FIGS. 1A-11 may operate as polarization isolators or polarization-dependent beamsplitters.

In some embodiments, one or more r-VBGs 100 are incorporated within an optical isolator.

Figure 3A:
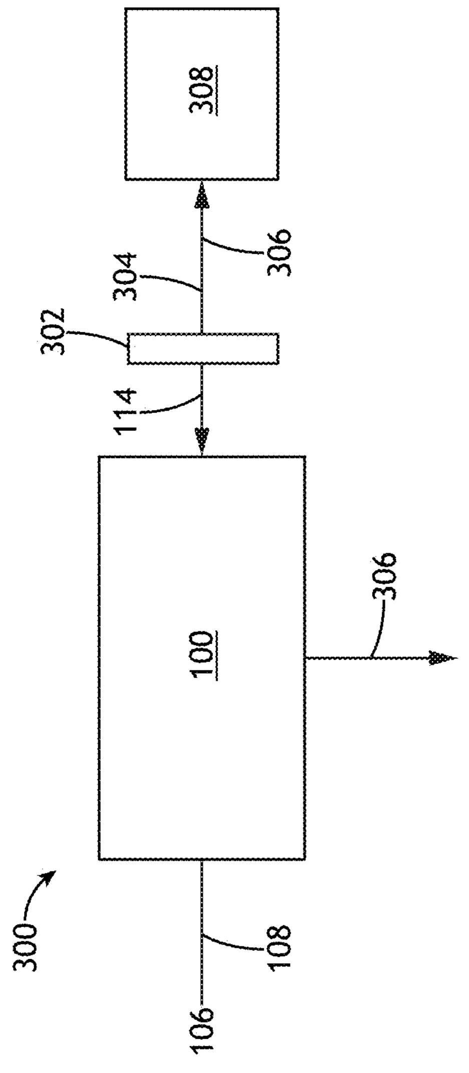
FIG. 3A is a block diagram view of an optical isolator with polarization-controlling optics configured to operate on transmitted light from the r-VBG, in accordance with one or more embodiments of the present disclosure.
Figure 3B:
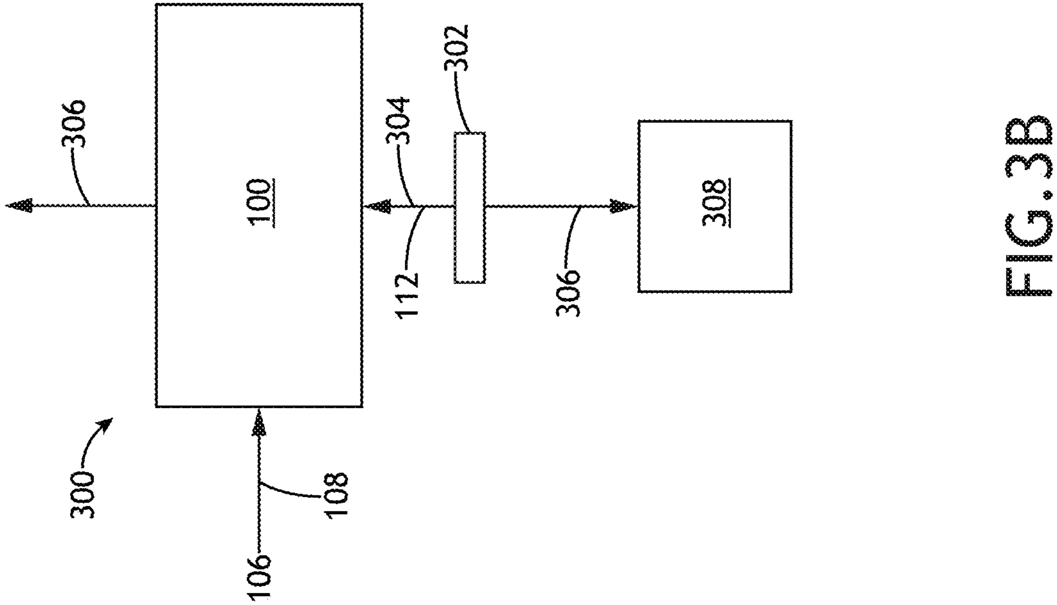
FIG. 3B is a block diagram view of an optical isolator with polarization-controlling optics configured to operate on reflected light from the r-VBG, in accordance with one or more embodiments of the present disclosure.

FIGS. 3A-3B depict block diagram views of different non-limiting implementations of an optical isolator 300, in accordance with one or more embodiments of the present disclosure. In embodiments, an optical isolator 300 includes one or more r-VBGs 100 to receive input light 108 and polarization-controlling optics 302 configured to transmit outgoing light 304 from the r-VBGs 100 (e.g., transmitted light 114 or reflected light 112) and modify a polarization of return light 306, whereupon the return light 306 through the one or more r-VBGs 100 follows a different path than the original input light 108. As a result, a source of the input light 108 is isolated from the return light 306. For example, the return light 306 may correspond to, but is not required to correspond to, light reflected from an object 308.

FIG. 3A is a block diagram view of an optical isolator 300 with polarization-controlling optics 302 configured to operate on transmitted light 114 from the r-VBG 100, in accordance with one or more embodiments of the present disclosure. FIG. 3B is a block diagram view of an optical isolator 300 with polarization-controlling optics 302 configured to operate on reflected light 112 from the r-VBG 100, in accordance with one or more embodiments of the present disclosure.

In some embodiments, the polarization-controlling optics 302 include a quarter-wave optical retarder such as, but not limited to, a quarter waveplate (e.g., a $\lambda/4$ waveplate). In this configuration, input light 108 incident on one or more r-VBGs 100 may exit as linearly polarized light with a first polarization direction and may then propagate through the quarter-wave optical retarder, whereupon it may be converted to circularly-polarized light. The return light 306 may then propagate through the quarter-wave optical retarder again in the opposite direction and be converted to linearly-polarized light with a second polarization direction orthogonal to the first polarization direction. As a result, this return light 306 will pass through the one or more r-VBGs 100 along a different path than the original input light 108 and thus exits along a direction different than the input light 108. In a general sense, however, the polarization-controlling optics 302 may include any combination of optical elements that rotates return light 306 by 90-degrees such that the return light 306 passes through the one or more r-VBGs 100 along a different path than the original input light 108.

FIGS. 4A-5C depict various non-limiting configurations of an optical isolator 300 including one or more r-VBGs 100.

Figure 4A:
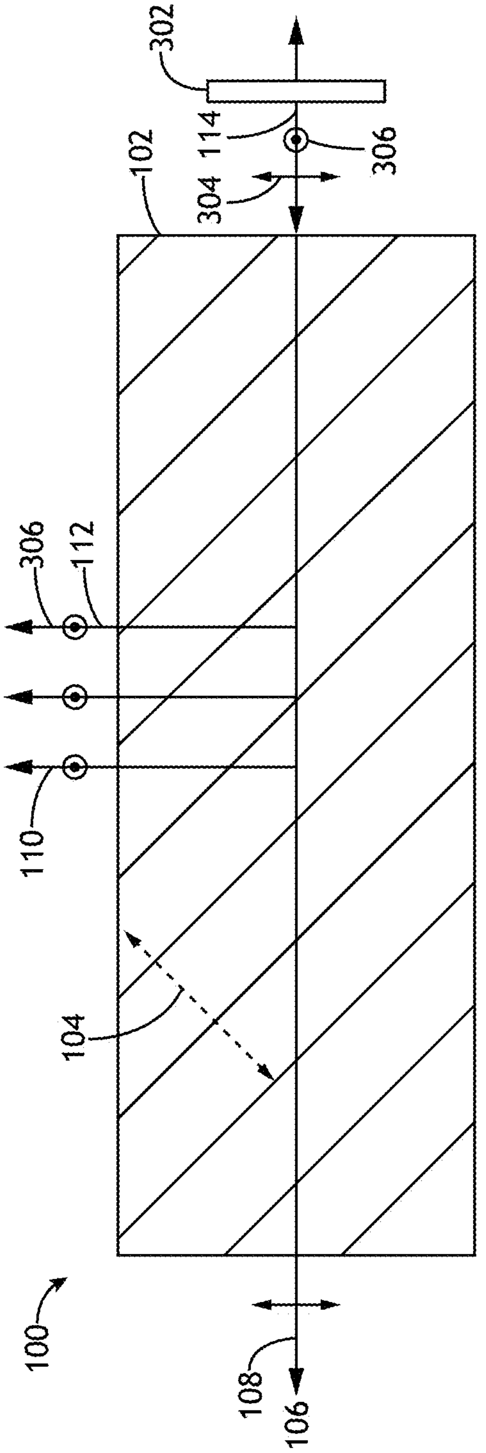
FIG. 4A is a schematic diagram of an optical isolator including a single r-VBG having a uniform period of refractive index variation, where polarization-controlling optics are placed to receive transmitted light from the r-VBG, in accordance with one or more embodiments of the present disclosure.
Figure 4A:
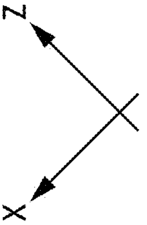

FIG. 4A is a schematic diagram of an optical isolator 300 including a single r-VBG 100 having a uniform period of refractive index variation, where polarization-controlling optics 302 are placed to receive transmitted light 114 from the r-VBG 100, in accordance with one or more embodiments of the present disclosure. The r-VBG 100 in FIG. 4A is substantially similar to the r-VBG 100 depicted in FIGS. 1A and 1G such that all relevant descriptions apply. In FIG. 4A, incident input light 108 is in-plane polarized and is transmitted through the r-VBG 100 with high efficiency as transmitted light 114. This transmitted light 114 then propagates through polarization-controlling optics 302 (e.g., a quarter waveplate, or the like) and is modified by the polarization-controlling optics 302 to be circularly polarized. If a portion of this transmitted light 114 is retro-reflected (e.g., by an object 308), this return light 306 propagates again through the polarization-controlling optics 302 and is converted to linear out-of-plane polarized light and is reflected by the r-VBG 100 as reflected light 112. It is to be understood that FIG. 4A and the associated description is merely illustrative and should not be interpreted as limiting on the present disclosure. As described by Equation (2), the wavelength at which a Bragg condition is satisfied may be tuned based on the period of the refractive index modulation as well as the angle between the grating vector direction 104 and the incidence direction 106. In this way, any configuration of an r-VBG 100 providing isolation of a desired wavelength is within the spirit and scope of the present disclosure.

Figure 4B:
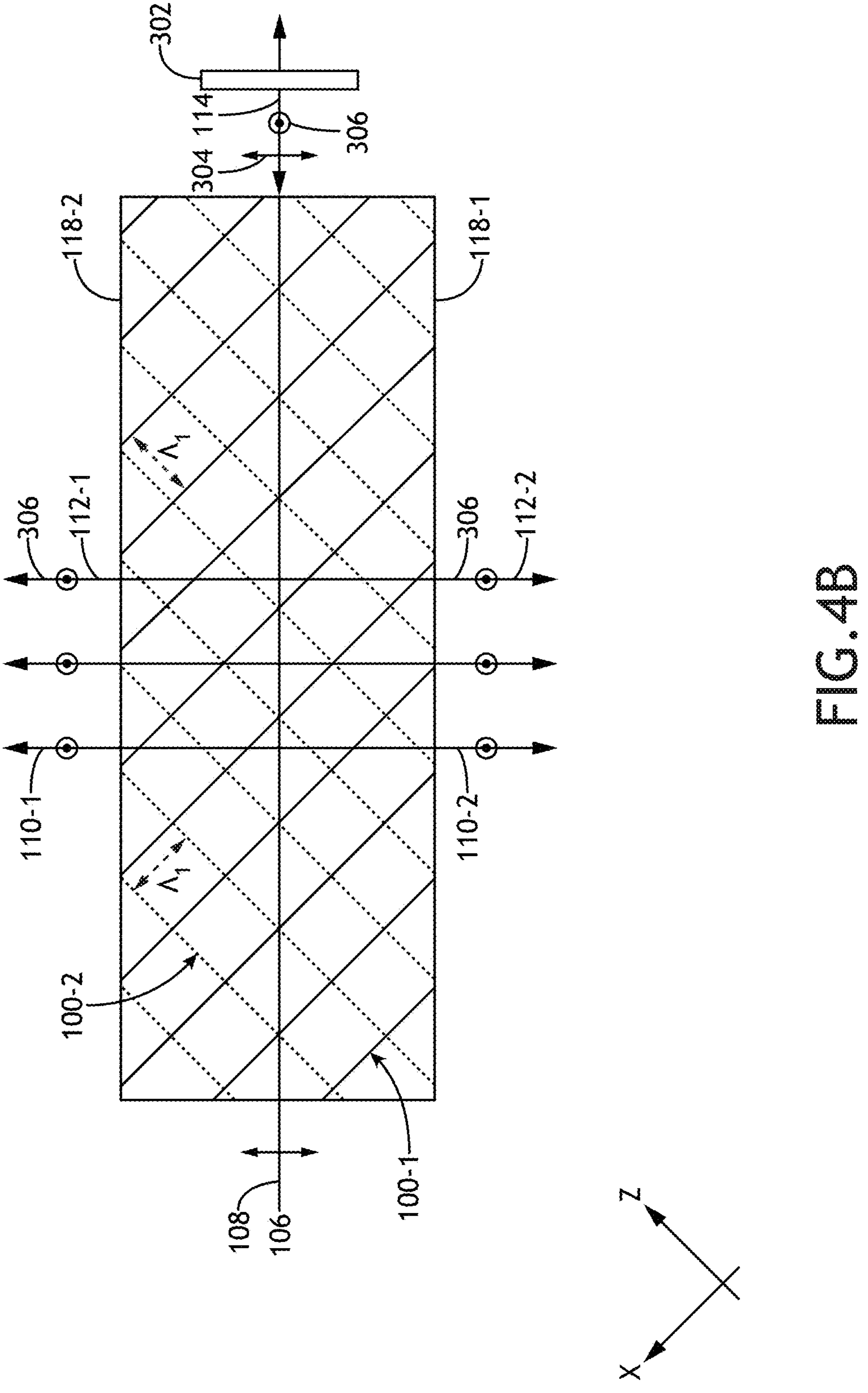
FIG. 4B is a schematic diagram of an optical isolator including two multiplexed r-VBGs in the X configuration depicted in FIG. 1E, where polarization-controlling optics are placed to receive transmitted light from the r-VBG, in accordance with one or more embodiments of the present disclosure.

In some embodiments, an optical isolator 300 includes two or more r-VBGs 100 arranged to reflect light of a common wavelength. Such a configuration may improve isolation performance by increasing an efficiency at which the return light 306 is reflected and thus diverted from the original incidence direction 106. As an example, FIG. 4B is a schematic diagram of an optical isolator 300 including two multiplexed r-VBGs 100 in the X-configuration depicted in FIG. 1E, where polarization-controlling optics 302 are placed to receive transmitted light 114 from the r-VBG 100, in accordance with one or more embodiments of the present disclosure. In this configuration, the two multiplexed r-VBGs 100 are each oriented at a 45-degree angle relative to the incidence direction 106 and have the same uniform periods of refractive index variation. Both r-VBGs 100 simultaneously operate to reflect the return light 306 at this common wavelength along the respective reflection directions 110-1, 110-2 (e.g., as reflected light 112-1, 112-2), which results in increased reflection efficiency. This increased reflection efficiency may provide greater overall efficiency for a material 102 of a certain length along the incidence direction 106 or reduce the length of material 102 along the incidence direction 106 required to achieve a desired efficiency. Additionally and as described with respect to FIG. 4A, it is to be understood that the particular configuration depicted in FIG. 4B is merely illustrative and any configuration of multiplexed r-VBGs 100 providing isolation of a selected wavelength is within the spirit and scope of the present disclosure. Additionally, an optical isolator 300 may generally include any number of r-VBGs 100 in multiplexed and/or cascaded configurations to provide isolation at a selected wavelength.

In some embodiments, an optical isolator 300 includes one or more r-VBGs 100 configured to provide isolation of different wavelengths. Such a configuration may be suitable for, but is not limited to, laser applications in which may be desirable to isolate a seed laser source from not only return light 306 with the seed wavelength but also from light with other wavelengths emitted from a gain medium. For example, an optical isolator 300 including one or more r-VBGs 100 may be placed between a seed laser and a laser cavity with a gain medium to provide optical isolation of a wavelength associated with the seed laser and optical isolation of one or more wavelengths associated with spontaneous and/or stimulated emission from the gain medium.

Figure 4C:
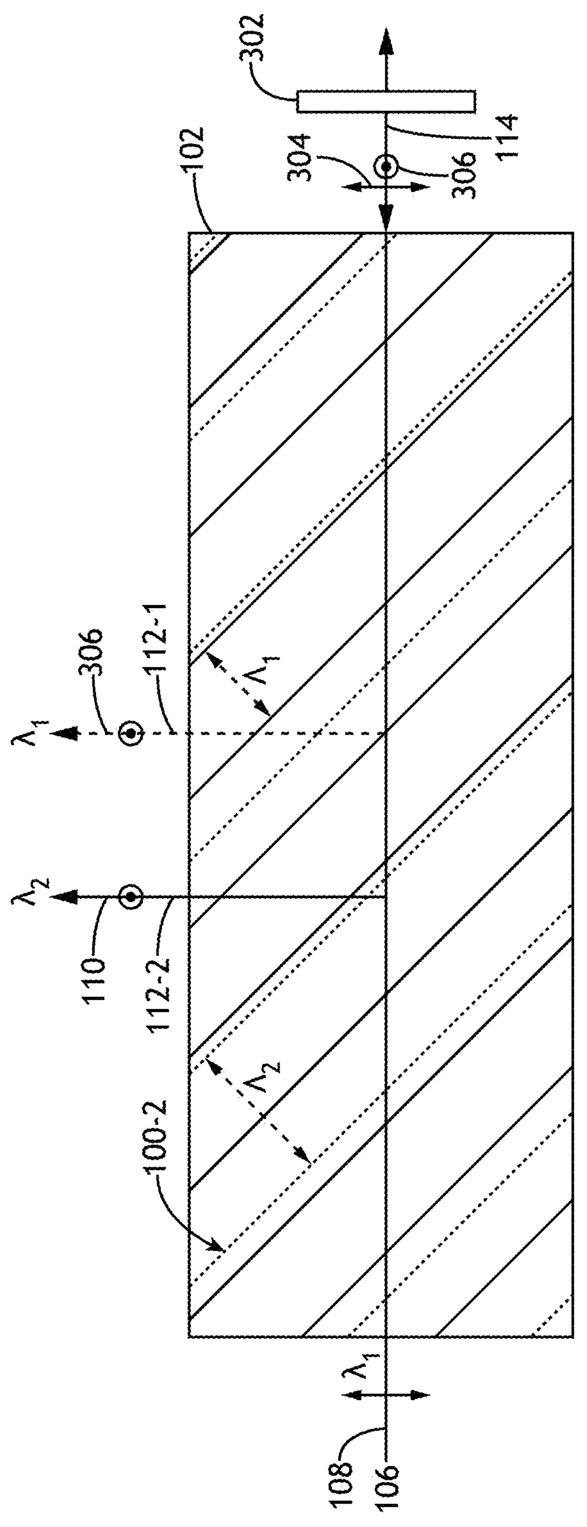
FIG. 4C is a schematic diagram of an optical isolator including two multiplexed r-VBGs providing Bragg reflection of two wavelengths of return light along a common direction, in accordance with one or more embodiments of the present disclosure.
Figure 4C:
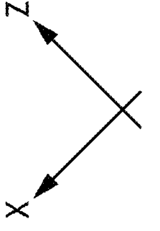

FIG. 4C is a schematic diagram of an optical isolator 300 including two multiplexed r-VBGs 100 providing Bragg reflection of two wavelengths of return light along a common direction, in accordance with one or more embodiments of the present disclosure. The r-VBGs 100 in FIG. 4C are substantially similar to those depicted in FIG. 1D such that all relevant descriptions apply. In this configuration, in-plane polarized input light 108 with a first wavelength $\lambda_1$ the optical isolator 300 is transmitted through the r-VBGs 100 and modified the polarization-controlling optics 302, and out-of-plane return light with wavelengths $\lambda_1$ and $\lambda_2$ propagating along the incidence direction 106 in reverse through the polarization-controlling optics 302 are reflected as reflected light 112-1 and reflected light 112-2, respectively.

Figure 4D:
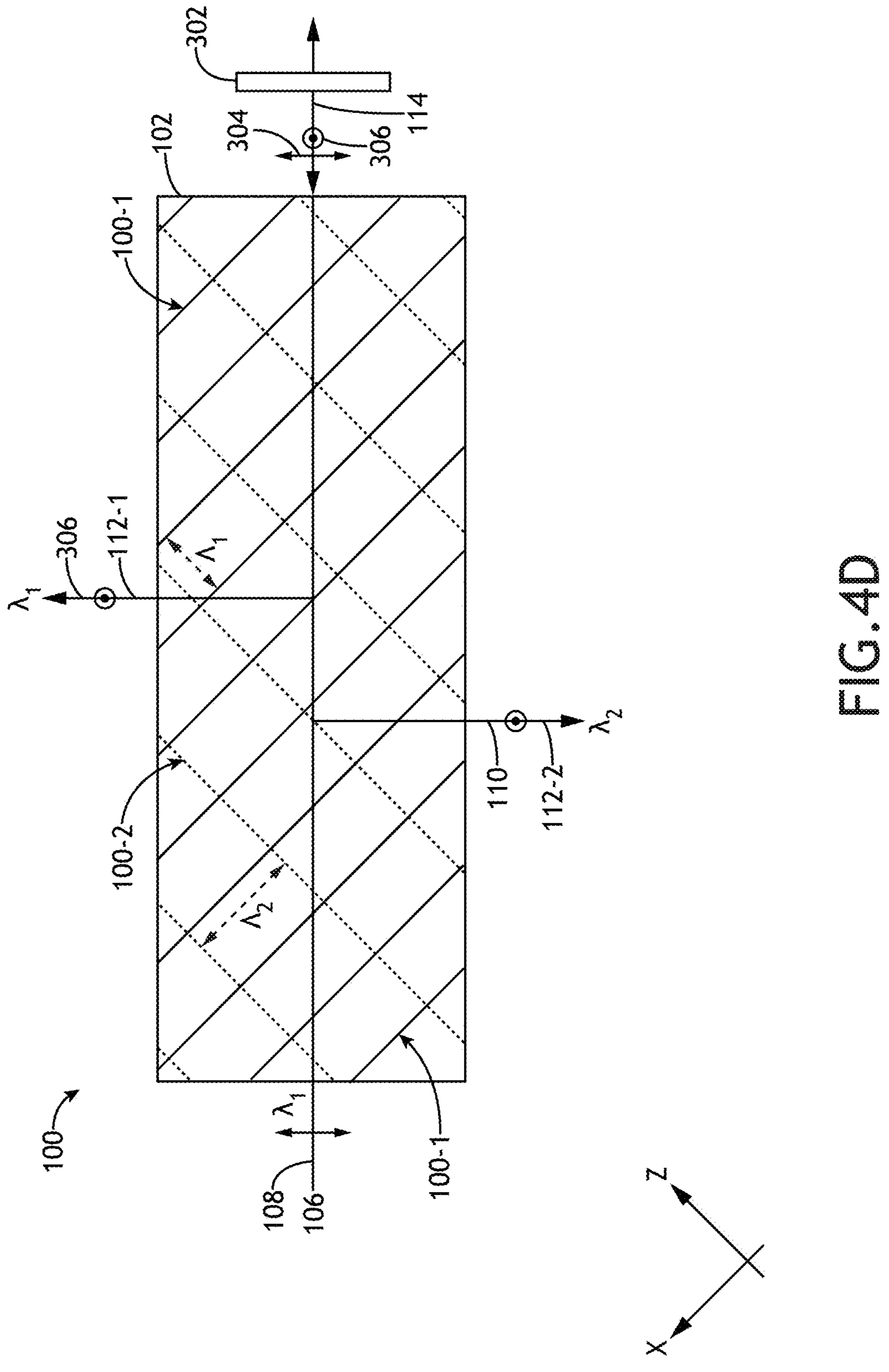
FIG. 4D is a schematic diagram of an optical isolator including two multiplexed r-VBGs providing Bragg reflection of two wavelengths along different directions, in accordance with one or more embodiments of the present disclosure.

FIG. 4D is a schematic diagram of an optical isolator 300 including two multiplexed r-VBGs 100 providing Bragg reflection of two wavelengths along different directions, in accordance with one or more embodiments of the present disclosure. FIG. 4D may be substantially similar to FIG. 4C except that the grating vector directions 104 of the r-VBGs 100 are not parallel. Here, they are orthogonal and both oriented at 45-degrees relative to the incidence direction 106, but this is merely illustrative and not limiting.

Figure 4E:
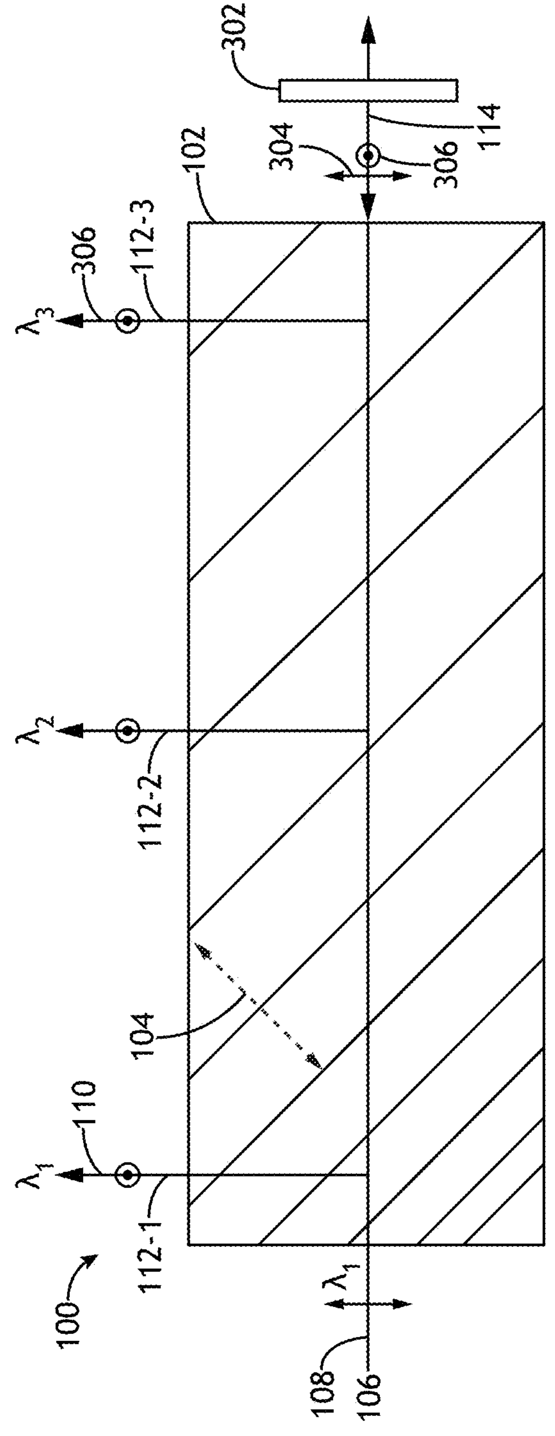
FIG. 4E is a schematic diagram of an optical isolator including a single chirped r-VBG providing Bragg reflection of a range of wavelengths, in accordance with one or more embodiments of the present disclosure.
Figure 4E:
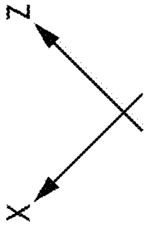

FIG. 4E is a schematic diagram of an optical isolator 300 including a single chirped r-VBG 100 providing Bragg reflection of a range of wavelengths, in accordance with one or more embodiments of the present disclosure. The r-VBG 100 in FIG. 4E is substantially similar to FIG. 1C such that all relevant limitations apply. In this configuration, out-of-plane return light 306 within a range of wavelengths (e.g., between $\lambda_1$ and $\lambda_3$) may be reflected by the r-VBG 100 (e.g., as reflected light 112-1 through 112-3).

Figure 4F:
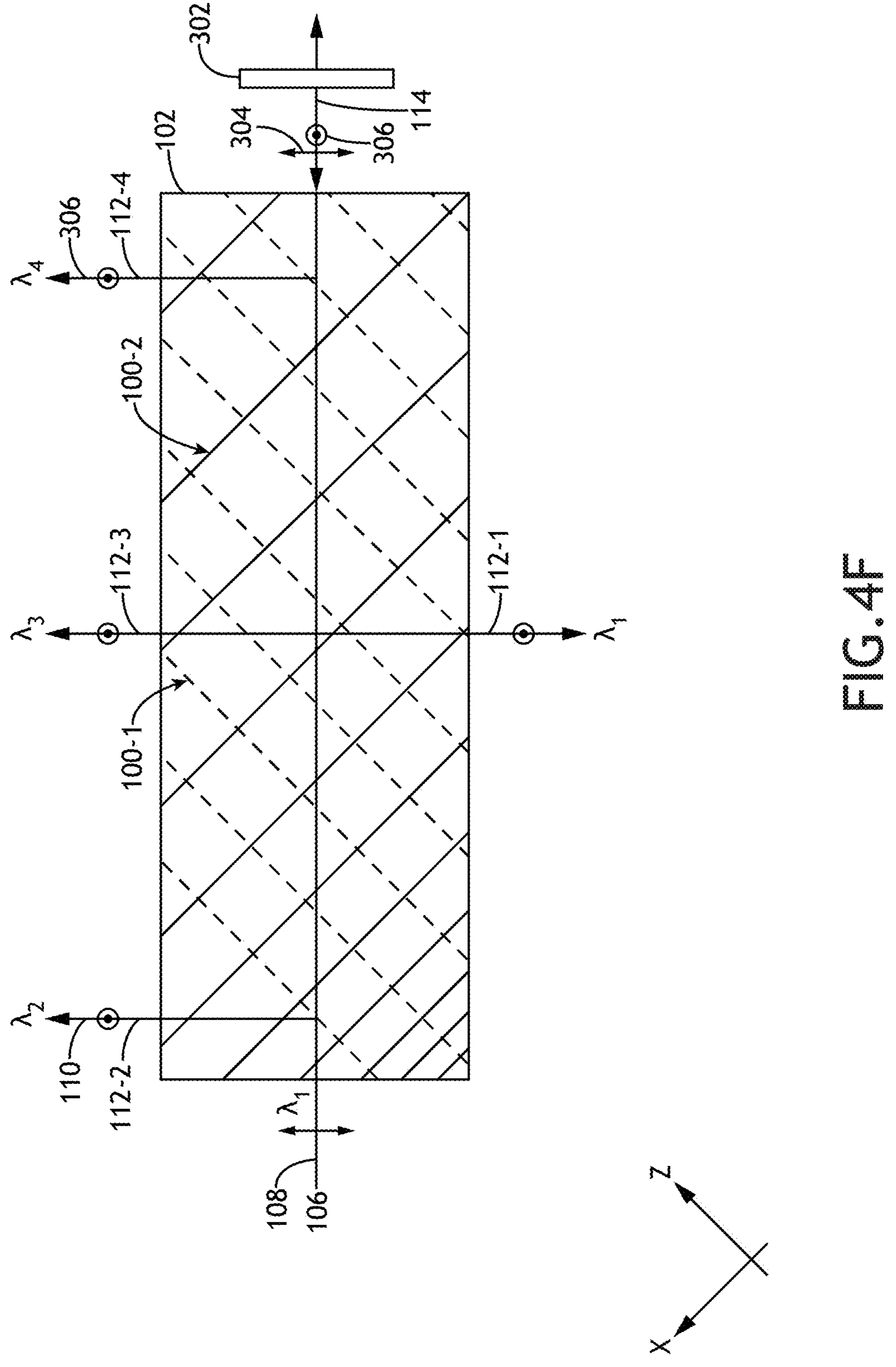
FIG. 4F is a schematic diagram of an optical isolator including both a uniform r-VBG and a chirped r-VBG, in accordance with one or more embodiments of the present disclosure.

FIG. 4F is a schematic diagram of an optical isolator 300 including both a uniform r-VBG 100 and a chirped r-VBG 100, in accordance with one or more embodiments of the present disclosure. For example, a first r-VBG 100-1 may correspond to FIG. 4A and the second r-VBG 100-2 may correspond to FIG. 4E. In general, the r-VBGs 100 may be configured to provide isolation of any selected wavelengths or range of wavelengths. FIG. 4F depicts a particular case in which the first r-VBG 100-1 reflects the same wavelength ($\lambda_1$) as the input light 108 (e.g., providing reflected light 112-1) and the second r-VBG 100-2 reflects wavelengths in a range $\lambda_2$ to $\lambda_4$) (e.g., as reflected light 112-2 through 112-4), which may or may not include $\lambda_1$. Such a configuration may be suitable for, but is not limited to, simultaneously isolating a seed laser operating at $\lambda_1$ and emission from pump and/or gain wavelengths in the range $\lambda_2$ to $\lambda_4$.

Figure 5A:
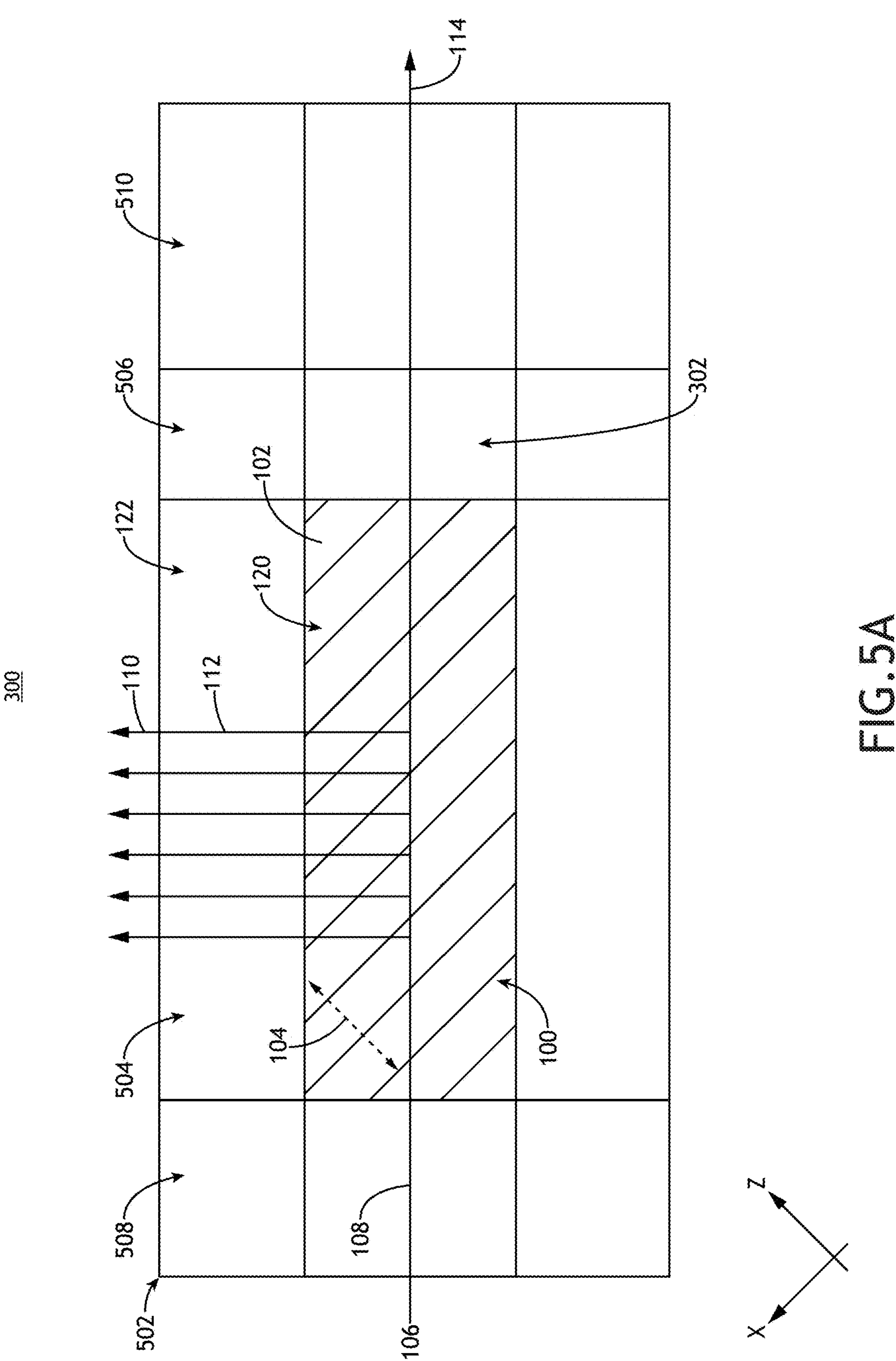
FIG. 5A is a block diagram view of a fiber-based optical isolator including an r-VBG, in accordance with one or more embodiments of the present disclosure.
Figure 5B:
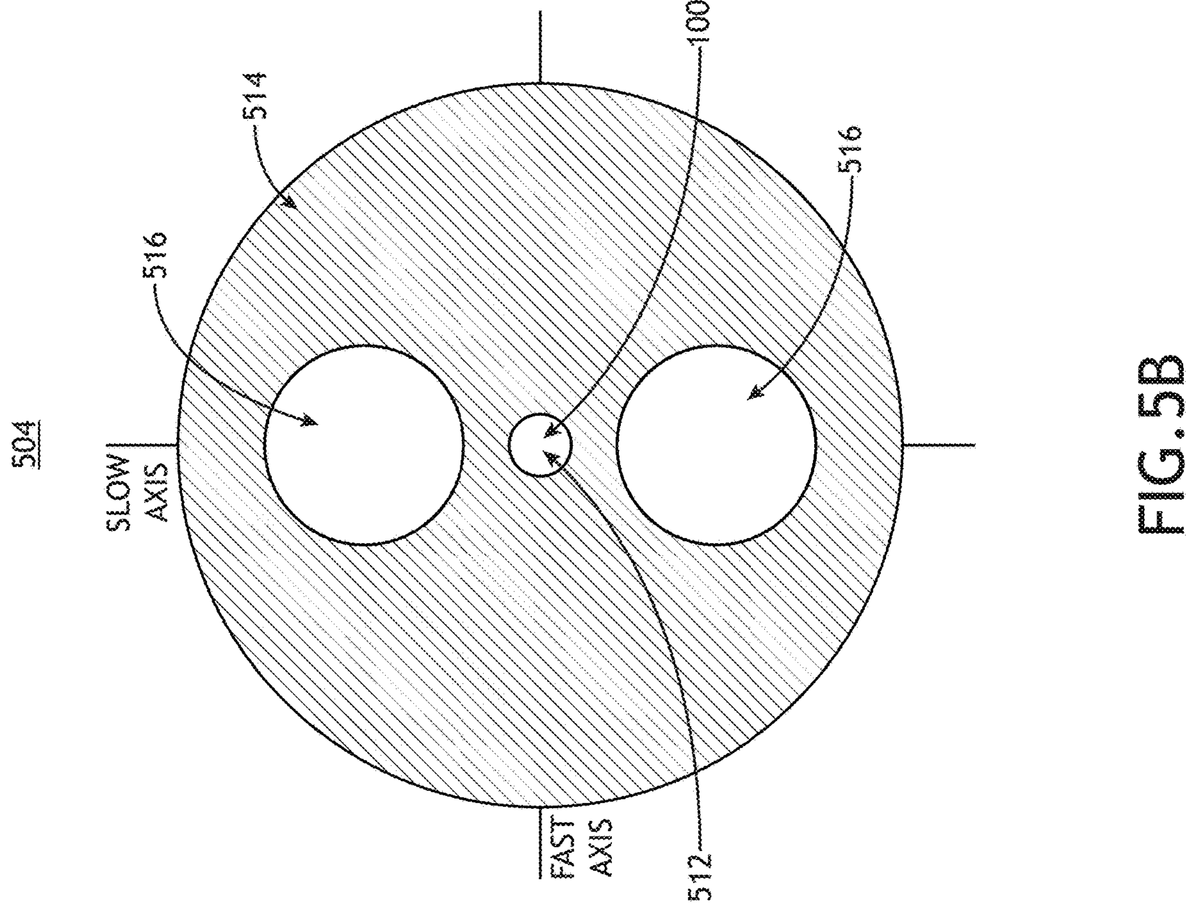
FIG. 5B is a cross-sectional view of a fiber segment including an r-VBG depicted in FIG. 5A, in accordance with one or more embodiments of the present disclosure.
Figure 5C:
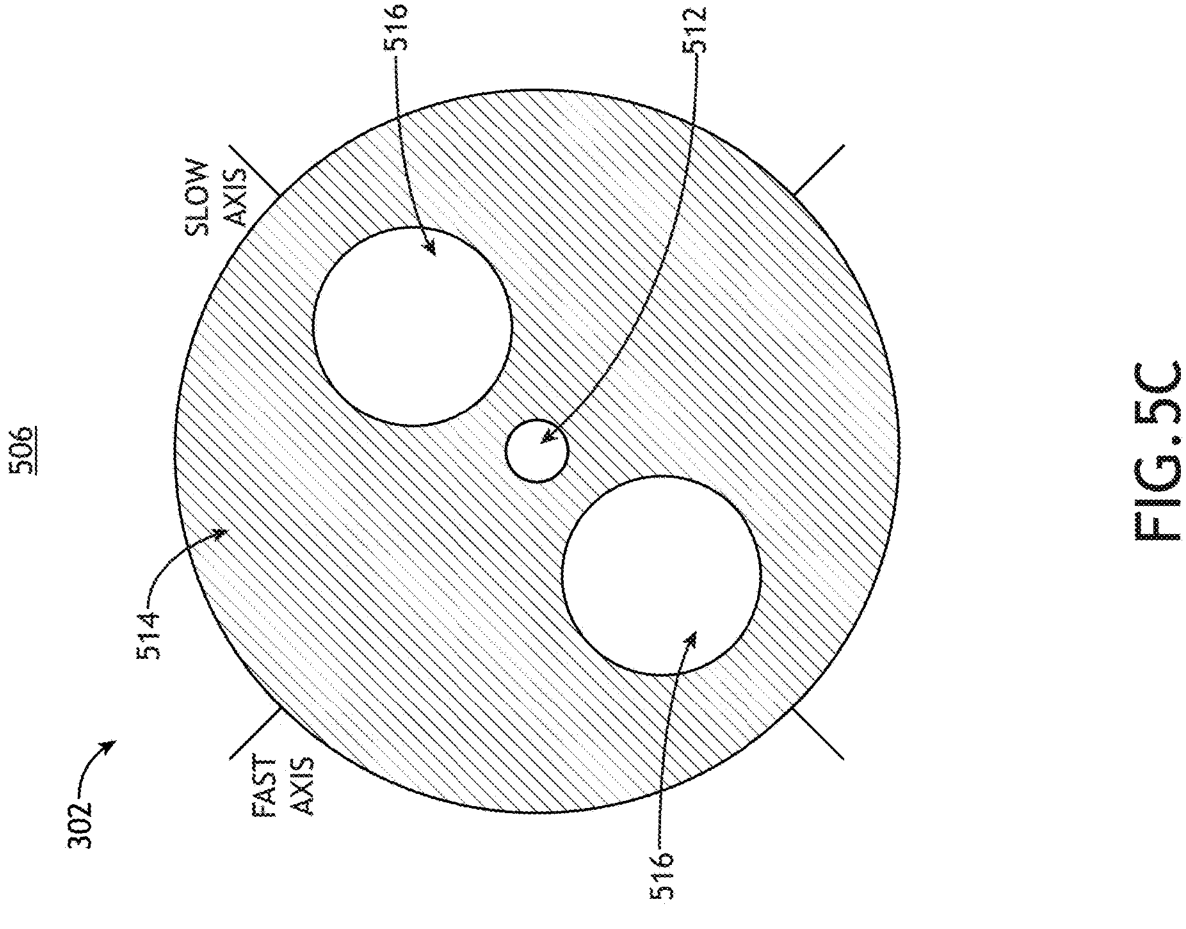
FIG. 5C is a cross-sectional view of the segment providing the polarization-controlling optics depicted in FIG. 5A, in accordance with one or more embodiments of the present disclosure.

Referring now to FIGS. 5A-5C, polarization-sensitive r-VBGs 100 with waveguiding structures are described in greater detail, in accordance with one or more embodiments of the present disclosure.

As described previously herein with respect to FIGS. 1H and 1I, an r-VBG 100 may be formed within or may include a waveguide 120. It is contemplated herein that any such configuration may be suitable for use in an optical isolator 300 as described herein. In particular, light may be guided as it propagates along the incidence direction 106 in either forward or backward directions.

Further, polarization-controlling optics 302 may be formed as bulk components and/or waveguiding components. In some embodiments, an r-VBG 100 formed within or including a waveguide 120 may be coupled using free-space optics to bulk polarization-controlling optics 302. In some embodiments, waveguide-based polarization-controlling optics 302 are directly coupled with a waveguide 120 including or within an r-VBG 100.

FIG. 5A is a block diagram view of a fiber-based optical isolator 300 including an r-VBG 100, in accordance with one or more embodiments of the present disclosure. In some embodiments, a fiber-based optical isolator 300 includes multiple fiber segments spliced together to form a final fiber 502. For example, the optical isolator 300 may include a segment 504 with an r-VBG 100 coupled with a segment 506 including polarization-controlling optics 302. The optical isolator 300 may further include a segment 508 prior to the r-VBG 100 and/or a segment 510 after the polarization-controlling optics 302.

In some embodiments, at least a portion of the fiber 502 is a polarization-maintaining fiber to maintain a polarization of light as it propagates to, from, and/or within the r-VBG 100 to maintain performance as described throughout the present disclosure. Further, both the r-VBG 100 and polarization-controlling optics 302 may be formed with polarization-maintaining fiber.

FIG. 5B is a cross-sectional view of the segment 504 including an r-VBG 100 depicted in FIG. 5A, in accordance with one or more embodiments of the present disclosure. In FIG. 5B, this segment 504 includes a core 512 including the r-VBG 100 and further includes an asymmetric cladding 514 providing direction-dependent losses suitable for maintaining polarization of guided light. The particular design of FIG. 5B includes stress rods 516 surrounding the core 512 along one direction. For example, the stress rods 516 may be have a different composition than other portions of the cladding and may break induce birefringence with a fast axis and a slow axis (e.g., similar to birefringent crystals. In this configuration, either the slow axis or the fast axis may lie within the diffraction plane of the r-VBG 100.

FIG. 5C is a cross-sectional view of the segment 506 providing the polarization-controlling optics 302 depicted in FIG. 5A, in accordance with one or more embodiments of the present disclosure. In particular, the segment 506 may have asymmetric cladding 514 with fast and slow axes rotated 45-degrees relative to the segment 504 including the r-VBG 100 depicted in FIG. 5B. Further, the length of the segment 506 may be selected to achieve a quarter-wave optical retardation (e.g., a phase shift of $\lambda/4$) for guided light in either forward or reverse directions. As a result, this fiber segment 506 may operate as a quarter waveplate such that transmitted light 114 from the r-VBG 100 with in-plane polarization is converted to a circular polarization and return light 306 may be converted to out-of-plane polarization for reflection by the r-VBG 100.

It is to be understood that the particular design of a polarization-maintaining fiber in FIGS. 5B-5C is merely illustrative and any polarization-maintaining design is within the spirit and scope of the present disclosure.

Figure 6:
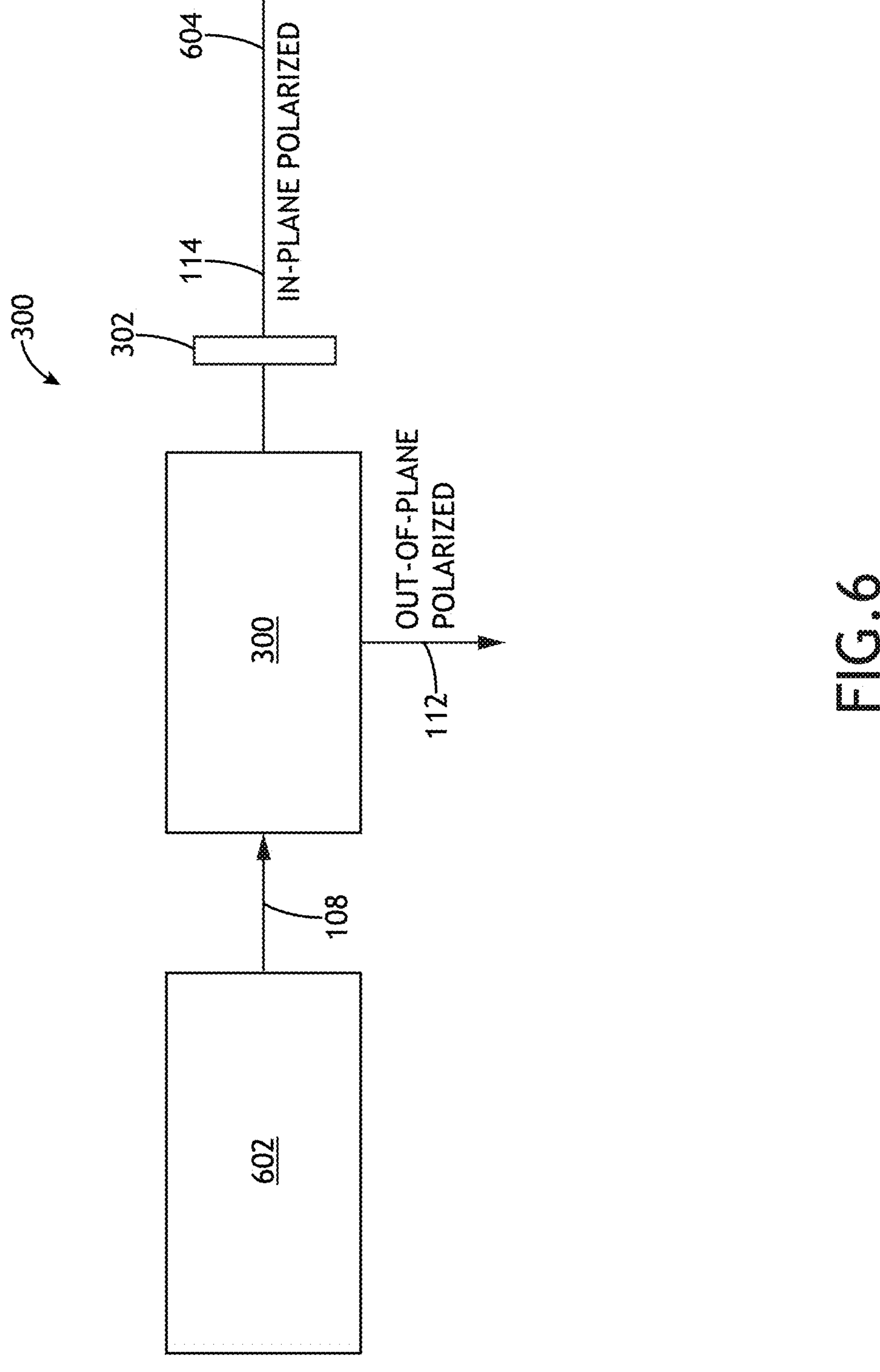
FIG. 6 is a simplified block diagram view of an optical source, in accordance with one or more embodiments of the present disclosure.
Figure 7:
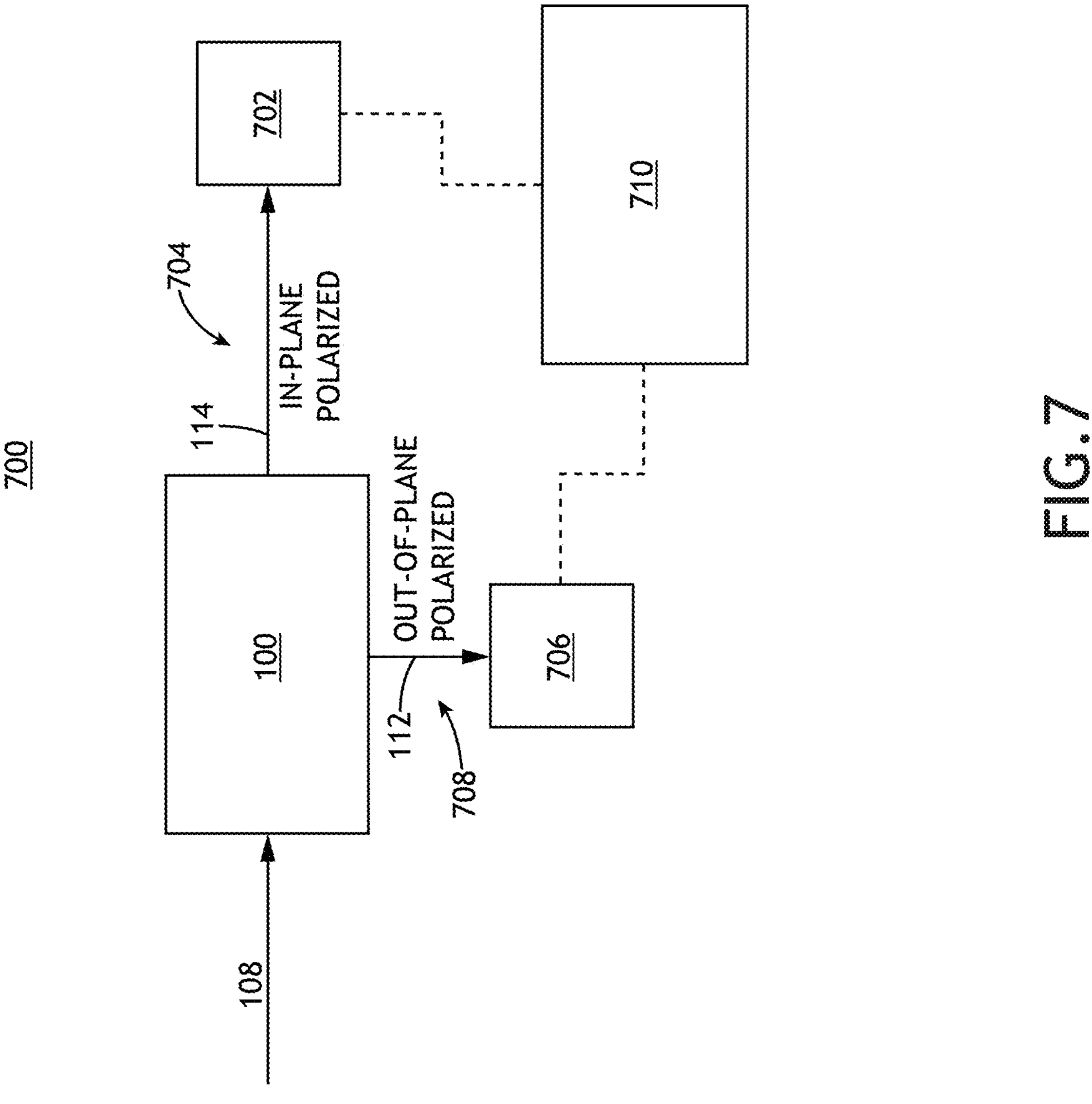
FIG. 7 is a simplified block diagram view of a polarization analyzer, in accordance with one or more embodiments of the present disclosure.

Referring now to FIGS. 6 and 7, additional systems incorporating an r-VBG 100 for polarization control are described in greater detail, in accordance with one or more embodiments of the present disclosure.

FIG. 6 is a simplified block diagram view of an optical source 600, in accordance with one or more embodiments of the present disclosure. In some embodiments, an optical source 600 include a light source 602 and an r-VBG 100. In this configuration, the light source 602 may generate input light 108. As described previously herein, the r-VBG 100 may then transmit portions of the input light 108 that are in-plane polarized (e.g., as transmitted light 114) and reflect portions of the input light 108 that are out-of-plane polarized (e.g., as reflected light 112). Further, the in-plane polarized transmitted light 114 may be provided as an output beam 604 of the optical source 600. In some embodiments, the optical source 600 may further include polarization-controlling optics 302 coupled to the output of the r-VBG 100 to provide an optical isolator 300 as described herein.

Referring now generally to FIGS. 1A-6, it is to be understood that an optical isolator 300 may generally include polarization-controlling optics 302 configured to receive either transmitted light 114 or reflected light 112 from an r-VBG 100. In this way, any depicts of polarization-controlling optics 302 configured to receive transmitted light 114 are merely illustrative and should not be interpreted as limiting the scope of the present disclosure.

FIG. 7 is a simplified block diagram view of a polarization analyzer 700, in accordance with one or more embodiments of the present disclosure. In some embodiments, the polarization analyzer 700 includes a first detector 702 along a transmission path 704 to receive out-of-plane polarized transmitted light 114 from the r-VBG 100 and a second detector 606 along a reflection path 608 to receive s-polarized reflected light from the r-VBG 100. Although not shown, the polarization analyzer 700 may include additional components such as, but not limited to, integrating spheres or lenses.

In this configuration, the first detector 702 and the second detector 606 may provide detection signals indicative of a power of light in each path, where a ratio of these detection signals may be indicative of a polarization state of the input light 108.

In some embodiments, the polarization analyzer 700 further includes a controller 706 to receive detection signals from the first detector 702 and the second detector 606 and further determine a polarization state of the input light 108 based on the detection signals. For example, the controller 706 may determine a polarization direction of a linearly-polarized input light 108.

The controller 706 may include any processing device known in the art including, but not limited to, a field-programmable gate array (FPGA), an application-specific integrated circuit (ASIC), a microprocessor, a digital signal processor (DSP), a desktop computer, a laptop, or a mobile device. In some embodiments, the controller 706 includes one or more processors configured to execute program instructions stored in memory.

It is to be understood, however, that FIG. 7 and the associated description is merely illustrative and not intended to be limiting. In some embodiments, the polarization analyzer 700 includes a single detector on either the transmission path 704 or the reflection path 608. Further, the polarization analyzer 700 may include a detector to capture a power of the input light 108 (e.g., via a beamsplitter or a pick-off mirror).

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical isolator comprising:

one or more rotated volume Bragg gratings (r-VBGs) within a volume of a material having an input face, wherein each of the r-VBGs is formed as planes of refractive index variation with periodicity along a grating vector at a non-zero angle relative to a normal vector of the input face, wherein each of the r-VBGs reflects along a common reflection path portions of input light propagating along an incidence vector through the input face that satisfies a Bragg condition for one or more selected wavelengths and has a polarization orthogonal to a diffraction plane formed by the associated grating vector and the incidence vector, wherein each of the r-VBGs transmits remaining portions of the input light as transmitted light along a transmission path; and one or more polarization-controlling optics located along the common reflection path of the one or more r-VBGs configured to rotate a polarization of retroreflected light propagating back along the common reflection path towards the one or more r-VBGs by 90 degrees, wherein the one or more r-VBGs transmit the retroreflected light.

2. The optical isolator of claim 1, wherein the one or more r-VBGs comprise a single r-VBG.

3. The optical isolator of claim 1, wherein the one or more r-VBGs comprise:

a first r-VBG; and a second r-VBG, wherein the grating vectors of the first and second r-VBGs are oriented along a common direction, wherein the refractive index variations of the first and second r-VBGs have different distributions along the respective grating vectors, wherein the one or more selected wavelengths reflected by the first r-VBG are different than the one or more selected wavelengths reflected by the second r-VBG.

4. The optical isolator of claim 3, wherein the refractive index variations of the first and second r-VBGs have uniform periods along the respective grating vectors.

5. The optical isolator of claim 3, wherein the refractive index variations of the first and second r-VBGs are chirped along the respective grating vectors.

6. The optical isolator of claim 1, wherein the one or more polarization-controlling optics comprise:

a quarter waveplate.

7. The optical isolator of claim 1, wherein the material comprises:

at least one of a glass, a crystal, a polymer, or a sol-gel.

8. The optical isolator of claim 1, wherein the r-VBG is apodized.

* * * * *